US006988024B2

(12) United States Patent
Funakura et al.

(10) Patent No.: US 6,988,024 B2
(45) Date of Patent: Jan. 17, 2006

(54) COGENERATION SYSTEM, OPERATION CONTROLLER FOR COGENERATION FACILITY, AND OPERATION PROGRAM FOR COGENERATION FACILITY

(75) Inventors: Masami Funakura, Neyagawa (JP); Shigeaki Matsubayashi, Ikoma (JP); Tsuneko Imagawa, Hirakata (JP); Etsuko Kanai, Kyoto (JP); Sachio Nagamitsu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/927,447

(22) Filed: Aug. 27, 2004

(65) Prior Publication Data

US 2005/0049757 A1 Mar. 3, 2005

(30) Foreign Application Priority Data

Aug. 29, 2003 (JP) .............................. 2003-305643

(51) Int. Cl.
*B60H 1/02* (2006.01)
*H02P 9/04* (2006.01)

(52) U.S. Cl. ...................... 700/288; 700/286; 700/291; 429/12; 429/22

(58) Field of Classification Search ................ 700/288, 700/286, 295, 296, 297; 429/12, 22
See application file for complete search history.

(56) References Cited

U.S. PATENT DOCUMENTS

| 4,510,756 | A | * | 4/1985 | Hise et al. ..................... 60/659 |
| 4,802,100 | A | * | 1/1989 | Aasen et al. ................. 700/288 |
| 5,479,358 | A | * | 12/1995 | Shimoda et al. ............ 700/291 |
| 5,566,084 | A | | 10/1996 | Cmar |
| 6,290,142 | B1 | * | 9/2001 | Togawa et al. ............ 237/12.1 |

(Continued)

FOREIGN PATENT DOCUMENTS

EP 0 568 822 11/1993

(Continued)

OTHER PUBLICATIONS

"Demand Forecasting for Electricity"—No date or author data available.*

(Continued)

*Primary Examiner*—Leo Picard
*Assistant Examiner*—Michael D. Masinick
(74) *Attorney, Agent, or Firm*—Wenderoth, Lind & Ponack, L.L.P.

(57) ABSTRACT

An operating condition determiner compares an operation starting time (t1) of network-connected first consuming apparatuses received by a schedule information receiver and a consumption starting time (t2) predicted by a predicting system based on a total consumption amount of the first consuming apparatuses and a second consuming apparatus, which is not network-connected, and determines the operation starting time (t1) as an operation starting time of a fuel cell if the operation starting time (t1) is earlier than the consumption starting time (t2) while determining the consumption starting time (t2) as such if the operation starting time (t1) is later than the consumption starting time (t2), so that the fuel cell can stably generate power. The fuel cell can stably supply power at a time when the consuming apparatuses start consuming power. The merit of introducing a cogeneration facility can be sufficiently exhibited even if both consuming apparatuses provided with a network connecting function and those provided with no such function exist.

36 Claims, 13 Drawing Sheets

U.S. PATENT DOCUMENTS

| | | | |
|---|---|---|---|
| 6,549,815 B1 * | 4/2003 | Kaji | 700/32 |
| 6,757,591 B2 * | 6/2004 | Kramer | 700/288 |
| 2003/0064262 A1 * | 4/2003 | Ballantine et al. | 429/24 |
| 2004/0096713 A1 * | 5/2004 | Ballantine et al | 429/23 |

FOREIGN PATENT DOCUMENTS

| | | | |
|---|---|---|---|
| EP | 1 398 842 | | 3/2004 |
| EP | 1398842 A1 * | | 3/2004 |
| GB | 2408112 A * | | 5/2005 |
| JP | 2003-129904 | | 5/2003 |
| JP | 2004333022 A * | | 11/2004 |
| JP | 2004349082 A * | | 12/2004 |
| JP | 2005011705 A * | | 1/2005 |

OTHER PUBLICATIONS

"Input Variable Selection for ANN-Based Short-Term Load Forecasting" -Drezga et al, Center for Energy and the Global Environment, Virginia Polytechnic Institute and State University, IEEE 1997.*

"A Real-Time Short-Term Load Forecasting System Using Functional Link Network" -Dash et al., IEEE Transactions on Power Systems, vol. 12, No. 2, May 1997.*

"Optimizing the Economic and Technical Viability of Combined Heat and Power and Advanced Control Systems" Robert Kramer. NiSource Energy Technologies, slideshow, May 2, 2002.*

* cited by examiner

FIG. 7A  TOTAL POWER CONSUMPTION PATTERN OF FIRST AND SECOND CONSUMING APPARATUSES

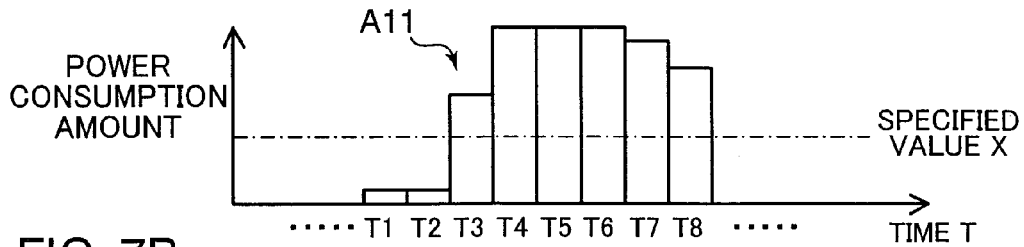

FIG. 7B  POWER CONSUMPTION PATTERN OF FIRST CONSUMING APPARATUSES BASED ON OPERATION SCHEDULE INFORMATION

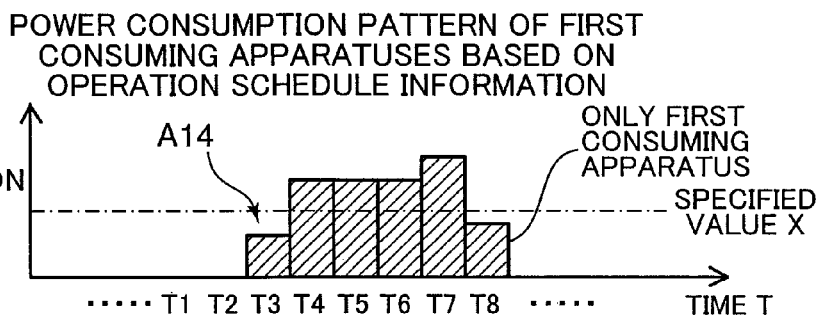

FIG. 7C  BREAKDOWN OF TOTAL POWER CONSUMPTION PATTERN OF FIRST AND SECOND CONSUMING APPARATUSES

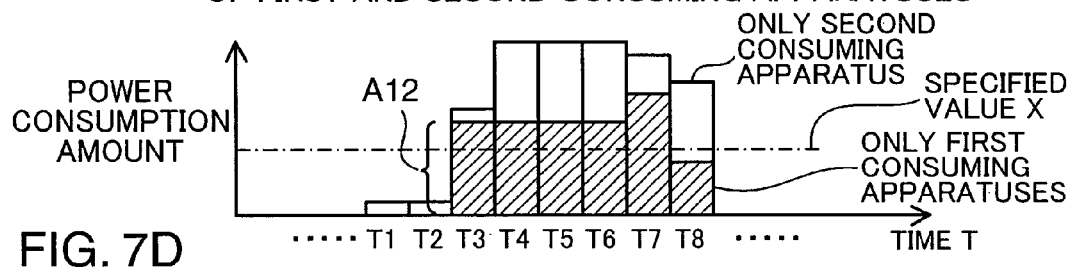

FIG. 7D  POWER CONSUMPTION PATTERN OF ONLY SECOND CONSUMING APPARATUS

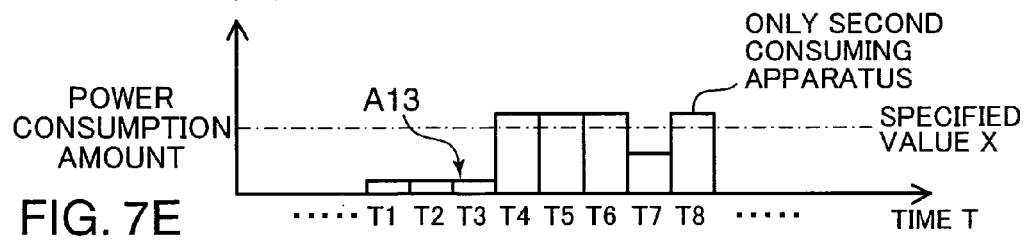

FIG. 7E  SUM OF B)+D) AND BREAKDOWN OF FIRST AND SECOND CONSUMING APPARATUSES

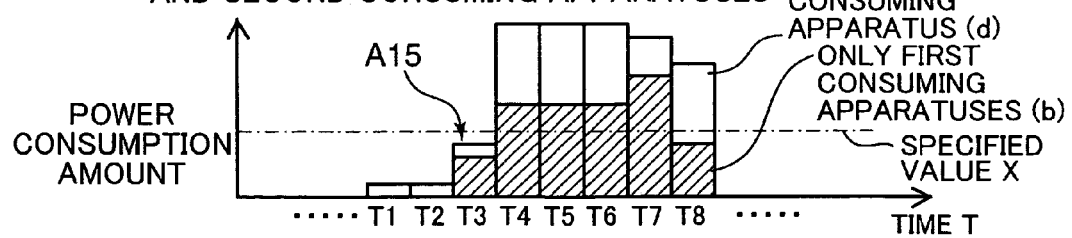

FIG. 9

○ : EXCEEDS SPECIFIED VALUE X
× : FALLS BELOW SPECIFIED VALUE X

| CASE | TOTAL POWER CONSUMPTION AMOUNT PREDICTED VALUE (A11) | POWER CONSUMPTION AMOUNT PREDICTED VALUE OF NETWORK HOUSEHOLD APPARATUSES BASED ON OPERATION SCHEDULE INFORMATION (A14) | OPERATION JUDGMENT ACCORDING TO SECOND EMBODIMENT | POWER CONSUMPTION AMOUNT PREDICTED VALUE OF ONLY NON-NETWORK HOUSEHOLD APPARATUSES (A13=A11-A12) | POWER CONSUMPTION AMOUNT PREDICTED VALUE OF ONLY NETWORK HOUSEHOLD APPARATUSES (A12) | POWER CONSUMPTION AMOUNT OF NETWORK HOUSEHOLD APPARATUSES BASED ON OPERATION SCHEDULE INFORMATION (A14) | TOTAL POWER CONSUMPTION AMOUNT PREDICTED VALUE (A15=A13+A14) | OPERATION JUDGMENT ACCORDING TO FOURTH EMBODIMENT |
|---|---|---|---|---|---|---|---|---|
| 1 | ○ | ○ | ON | ○ | ○ | ○ | ○ | ON |
| 2 |   | × | ON |   | ○ | × | ○ | ON |
| 3 |   | ○ | ON | ○ |   | ○ | ○ | ON |
| 4 |   | × | ON |   |   | × | × | OFF |
| 5 |   | ○ | ON | ○ | × | ○ | ○ | ON |
| 6 |   | × | ON | × |   | × | ○ | ON |
| 7 |   | ○ | ON |   | × | ○ | ○ | ON |
| 8 |   | × | ON | × | × | × | × | OFF |
| 9 | × | ○ | ON | × | × | ○ | ○ | ON |
| 10 |   | × | OFF | × | × | × | × | OFF |

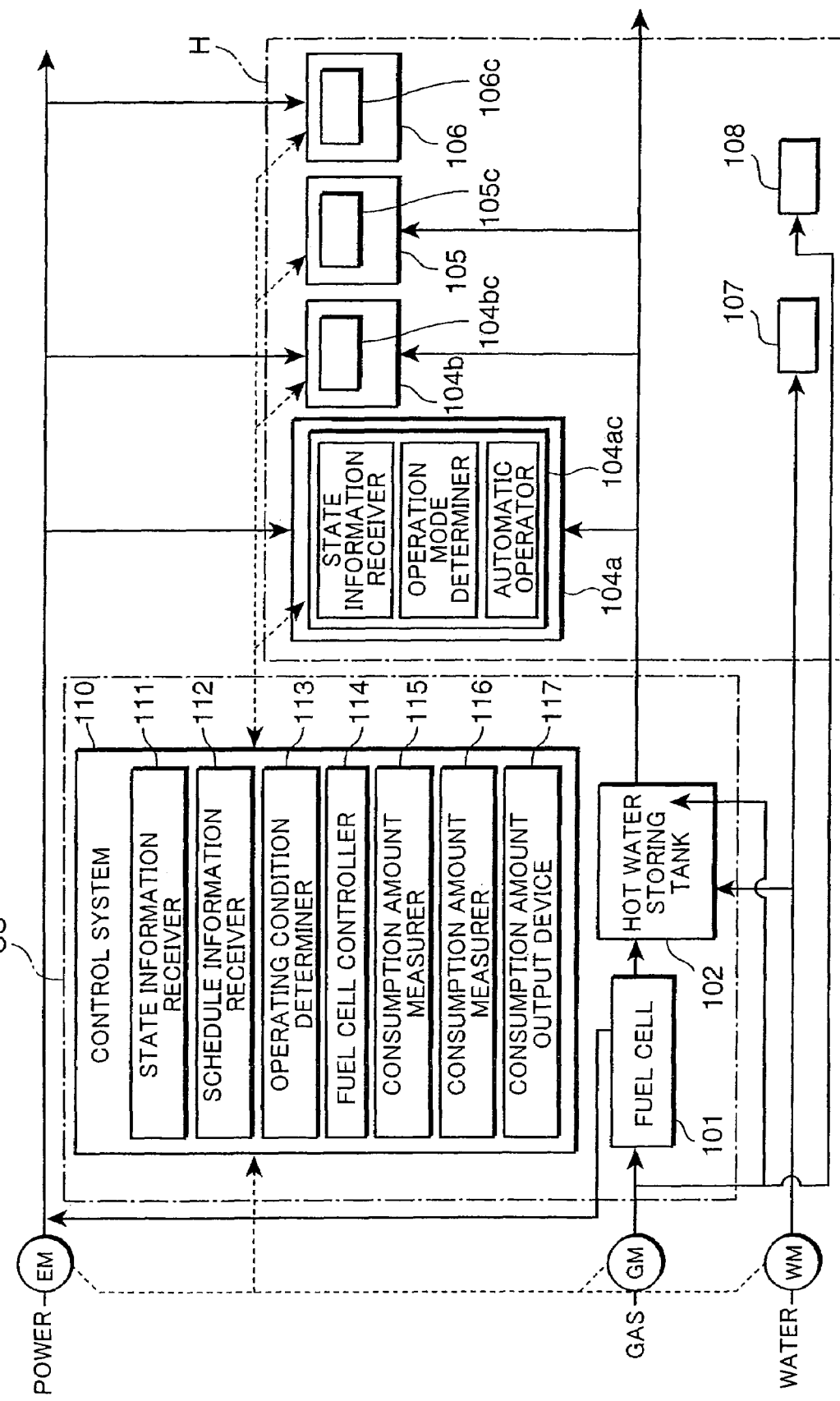

COGENERATION SYSTEM, OPERATION CONTROLLER FOR COGENERATION FACILITY, AND OPERATION PROGRAM FOR COGENERATION FACILITY

BACKGROUND OF THE INVENTION

1. Field of the Invention

The present invention relates to a cogeneration system for generating power and heat to be supplied to a plurality of consuming apparatuses (various household electric apparatuses and hot water supplying apparatuses, for example, at general household) consuming power and/or heat in order to operate these consuming apparatuses, an operation controller and operation program for a cogeneration facility.

A cogeneration system is provided with a generator having a fuel cell, a gas turbine or like prime mover as a driving source. The generated power is used at a place of demand (e.g. general household) together with power supplied, for example, from a power supplying company and the generated heat is also utilized at this place of demand, thereby trying to obtain an energy-saving effect.

However, the scale of demand for power and heat at general household is characterized by its considerably large range of variation although being small as compared to factories and commercial facilities. Thus, a problem has been pointed out that a serviceability ratio (i.e., a ratio of operating hours in a day) and a load ratio (i.e., ratio of load to the rated output) are limited and a sufficient energy-saving effect cannot be obtained even if the cogeneration system is introduced to the household.

There has been proposed a method for determining operating conditions of the cogeneration system and the consuming apparatuses from information on the power and heat generating state of the cogeneration system and information on the operation schedules of the consuming apparatuses and controlling the operations of the cogeneration system and the consuming apparatuses based on the respective operating conditions in order to solve the above problem and exhibit the merit of introducing a cogeneration facility (see for example, Japanese Unexamined Patent Publication No. 2003-129904).

FIG. 13 shows a known cogeneration system disclosed in the above publication. This system includes a cogeneration facility CS provided with a fuel cell 101 as a power generator, a hot-water storing tank 102 and a control system 110, a group H of various consuming apparatuses consuming power and/or heat, and energy supply sources such as power, gas and water. In the cogeneration facility CS, power is generated in the fuel cell 101 using the supplied gas or hot water is produced by being heated by the waste heat of the fuel cell 101 and stored in the hot-water storing tank 102, and the control system 110 controls the entire system or carries out a control for utilizing the generated power, hot water (heat). The consuming apparatus group H includes consuming apparatuses 104a, 104b such as a washing/drying machine and a dish washer consuming power and heat, a consuming apparatus 105 such as a hot water tap consuming only heat (hot water), a consuming apparatus 106 such as an electric light consuming only power, a consuming apparatus 108 such as a gas cooking stove consuming only gas, and a consuming apparatus 107 such as a water tap consuming only water. The consuming apparatuses 104a, 104b, 105, 106 are provided with controllers 104ac, 104bc, 105c, 106c for the operation control such as the start and end of the operation and the setting of an operation mode.

On the other hand, the control system 110 is provided with a state information receiver 111 for receiving information on the generating states of power and heat in the cogeneration facility CS; a schedule information receiver 112 for receiving information on schedules set by a user concerning the operations of the consuming apparatuses 104a, 104b, 105, 106; an operating condition determiner 113 for determining operating conditions of these consuming apparatuses and the fuel cell 101; a fuel cell controller 114 and a consuming apparatus controller 115 for respectively controlling the fuel cell 101 and the consuming apparatuses 104a, 104b, 105, 106 under the determined conditions, a consumption amount measurer 116 for measuring a consumption amount of the supplied power or the like, and a consumption amount output device 117.

In the cogeneration system thus constructed, the control system 110 can conduct a bilateral communication (indicated by broken-line arrows in FIG. 13) concerning the information on the operation schedules of the consuming apparatuses 104a, 104b, 105, 106 (operation scheduled periods, consumption amount information of power or heat as the form of energy to be consumed) and the generating state information of the power and heat in the cogeneration facility CS. Using generation information on the output states of the cogeneration facility CS at present (or in the future) such as a power output, a heat output, a stored power amount and a stored heat amount, and the operation schedule information on the operation periods during which the consuming apparatuses 104a, 104b, 105, 106 are operated or the consumption amount of power or heat at that time, the control system 110 determines the operating conditions of the cogeneration facility CS and the consuming apparatuses 104a, 104b, 105, 106 as follows.

First, the state information receiver 111 receives information on a present (or future) power output of the fuel cell 101 and the temperature of the hot water discharged from the hot water storing tank 102 from sensors (not shown) of the fuel cell 101 and the hot water storing tank 102. The schedule information receiver 112 receives the information on the operation schedules of the respective consuming apparatuses 104a, 104b, 105, 106, i.e., operation permissible time periods and power consumption amounts and heat consumption amounts based on the operation permissible time periods, from the respective controllers 104ac, 104bc, 105c, 106c. The operating condition determiner 113 increases a power load ratio of the fuel cell 101 within the operation permissible time periods of the respective consuming apparatuses 104a, 104b, 105, 106 received by the schedule information receiver 112, and determines the operating conditions of the respective consuming apparatuses 104a, 104b, 105, 106 and the fuel cell 101 so that the hot water stored in the hot water storing tank 102 can be efficiently consumed. The fuel cell controller 114 automatically operates the fuel cell 101 in accordance with the operating condition determined as above, and the consuming apparatus controller 115 controls the operations of the respective consuming apparatuses 104a, 104b, 105, 106 determined as above by the bilateral communication with the controllers 104ac, 104bc, 105c, 106c of the respective consuming apparatuses.

However, the cogeneration system of the above publication is said to be a system which can be built on the premise that all the consuming apparatuses and the cogeneration facility are connected with a network and the bilateral communication can be conducted via the network concerning the operation schedule information of the consuming apparatuses and the generating state information of the power and heat of the cogeneration facility. Accordingly, if both the consuming apparatuses provided with a the network connecting function and those provided with no such function exist in the cogeneration system, there is a problem that the merit of introducing the cogeneration system cannot be sufficiently exhibited.

Specifically, for so-called white household apparatuses such as washing machines and refrigerators, network white household apparatuses provided with a network connecting function are being commercialized. However, such white household apparatuses are still limited only to some types, and those provided with no network connecting function are a mainstream. Further, since the repurchase cycle of 10 years or longer is not seldom for the white household apparatuses, a state where some of the consuming apparatuses in the cogeneration system are provided with the network connecting function and the others are not is expected to continue for the time being.

In the case that there are consuming apparatuses provided with no network connecting function, the operation excluding such consuming apparatuses is obliged to be performed in the prior art system of the above publication and the fuel cell is controlled under the operating condition determined in the state different from an actual power or heat consumption amount. Generally, the fuel cell takes time to start stably supplying power after the activation from a stopped state because the temperature of a modifier needs to be increased. Thus, it is essential to determine the time at which the fuel cell is activated in accordance with a load expected for all the consuming apparatuses including those not connected with the network so that the fuel cell can stably supply power in conformity with the time at which the consuming apparatuses start consuming power.

SUMMARY OF THE INVENTION

It is an object of the present invention to provide a cogeneration system, cogeneration facility operation controller, and cogeneration facility operation program which are free from the problems residing in the prior art.

It is another object of the present invention to provide a cogeneration system, cogeneration facility operation controller, and cogeneration facility operation program which can sufficiently exhibit the merit of introducing a cogeneration facility even if both consuming apparatuses provided with a network connecting function and those provided with no such function exist.

According to an aspect of the present invention, a cogeneration system is provided with a cogeneration facility for generating power and heat, a plurality of consuming apparatuses consuming the power and/or heat generated by the cogeneration facility, and an operation controller for controlling the operation of the cogeneration facility. The consuming apparatuses include a first consuming apparatus which can automatically transmit operation schedule information of its own to the operation controller, and a second consuming apparatus which cannot automatically transmit the operation schedule information of its own.

The operation controller compares an operation starting time of the consuming apparatuses based on the operation schedule information and a consumption starting time based on the prediction of a total power and/or heat consumption of the consuming apparatuses. The operation starting time of the first and second cogeneration facilities is selectively determined based on result of the above-mentioned comparison.

These and other objects, features and advantages of the present invention will become more apparent upon a reading of the following detailed description and accompanying drawings.

BRIEF DESCRIPTION OF THE DRAWINGS

FIGS. 7A to 7E are histograms showing one exemplary power consumption pattern;

FIG. 9 is a table showing a comparison of cases of the second and fourth embodiments for an operation start judgment;

FIG. 13 is a block diagram showing an entire construction of a prior art cogeneration system.

DETAILED DESCRIPTION OF THE PREFERRED EMBODIMENTS OF THE INVENTION

Cogenerations according to embodiments of the present invention are described with reference to the accompanying drawings.

(First Embodiment)

Figure 1:
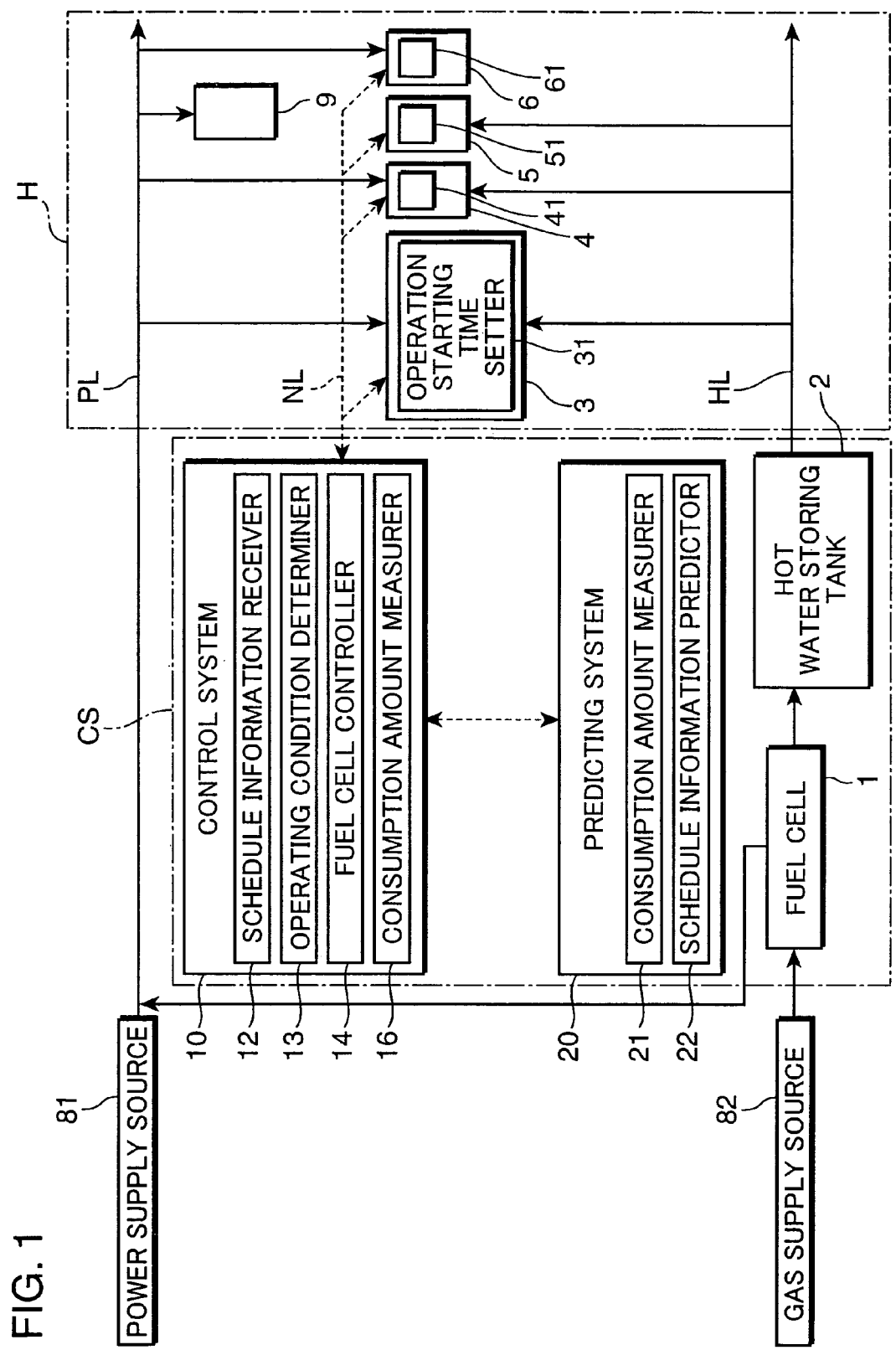
FIG. 1 is a block diagram showing an entire construction of a cogeneration system according to a first embodiment of the invention.

FIG. 1 is a block diagram showing the entire construction of a cogeneration system according to a first embodiment of the present invention. The cogeneration system of this embodiment is comprised of a cogeneration facility CS as a generating source of power and/or heat, a group H of various consuming apparatuses consuming power and/or heat, a power supply source 81 commercially supplied from a power supply company or the like, and a gas supply source 82 of town gas, propane gas or like gas.

The cogeneration facility CS includes a fuel cell 1 as one example of an apparatus capable of simultaneously generating power and heat, a hot water storing tank 2 for producing hot water using heat generated in the fuel cell 1 and storing the produced hot water, a control system 10 (operation controller) for controlling the operation of the fuel cell 1 in accordance with information, consumption prediction information and the like given from the consuming apparatus group H, controlling the entire system and carrying out a control for the utilization of the generated power, hot water (heat), and a predicting system 20 for predicting consumption starting times and consumption amounts of the consuming apparatuses.

Power given from the power supply source 81 is supplied to a specified consuming apparatus via a power line PL. Power is generated in the fuel cell 1 using gas supplied from the gas supply source 82, and the generated power is supplied to a specified consuming apparatus via the power line PL. Further, hot water is produced using the waste heat of the fuel cell 1, temporarily stored in the hot water storing tank 2 and supplied to a specified consuming apparatus via a heat line HL.

Various fuel cells can be used as the fuel cell 1. For example, high-temperature fuel cells such as a solid oxide fuel cell (SOFC) and a molten carbonate fuel cell (MCFC) of high-pressure or constant pressure type, and low-temperature fuel cells such as phosphoric acid fuel cell (PAFC) and a polymer electrolyte fuel cell (PEFC) can be suitably used.

The consuming apparatus group H includes consuming apparatuses 3, 4 consuming power and heat such as a washing/drying machine and a dish washer, a consuming apparatus 5 consuming only heat (hot water) such as a hot water tap, and consuming apparatuses 6, 9 consuming only power such as a rice cooker and an electric light. Accordingly, the consuming apparatuses 3, 4, 6 and 9 are connected with the power line PL, whereas the consuming apparatuses 3, 4 and 5 are connected with the heat line HL.

The consuming apparatus group H includes both the consuming apparatuses 3, 4, 5, 6 (first consuming apparatuses) network-connected with the control system 10 of the cogeneration facility CS (broken lines show their connected states in FIG. 1) and the consuming apparatus 9 (second consuming apparatus) which is not network-connected. Specifically, the network-connected first consuming apparatuses 3, 4, 5, 6 can automatically transmit operation schedule information set by operation starting time setter 31, 41, 51, 61 of their own having a timer function and the like to the control system 10 via a wired or wireless network NL. On the other hand, the second consuming apparatus 9 which is not network-connected cannot automatically transmit operation schedule information of its own to the control system 10.

The control system 10 is provided with a schedule information receiver 12, an operating condition determiner 13, a fuel cell controller 14 and a consumption amount measurer 16. The schedule information receiver 12 receives an operation starting time (t1) of the respective consuming apparatuses 3, 4, 6 consuming power. Specifically, the schedule information receiver 12 automatically receives information on operation start scheduled times inputted by means of tenkeys in the operation starting time setter 31, 41, 61 provided in the respective consuming apparatuses 3, 4, 6 via the network NL, wherein the earliest operation start scheduled time is received as the operation starting time (t1) of the first consuming apparatus. Instead of setting the earliest operation start scheduled time as the operation starting time (t1), priority may be, for example, given to the consuming apparatuses 3, 4, 6 and the operation start scheduled time of the consuming apparatus having the first priority may be set as the operation starting time (t1) or time at which all or some of the consuming apparatuses 3, 4, 6 start operating in an overlapping manner may be set as the operation starting time (t1).

The operating condition determiner 13 determines the operation starting time of the fuel cell 1 in accordance with the operation starting time (t1) of the first consuming apparatuses received by the schedule information receiver 12 and a consumption starting time (t2) predicted by the predicting system 20 to be described later. This is described in detail later with reference to a flowchart. The fuel cell controller 14 controls the operation of the fuel cell 1 so that the fuel cell 1 starts its operation at the operation starting time of the fuel cell 1 determined by the operating condition determiner 13. In this specification, the "operation starting time" of the fuel cell (cogeneration facility) means a time at which the fuel cell (cogeneration facility) reaches a state where required power (or heat) can be stably supplied. Accordingly, the fuel cell controller 14 controls an activation starting time of the fuel cell 1 and the like so that a preparatory operation, i.e., an activating operation such as preheating of a modifier, can be carried out in time for the "operation starting time". Further, the consumption amount measurer 16 measures and saves power consumption amounts during the past operations or power consumption patterns of the first consuming apparatuses 3, 4, 6 consuming power (in this embodiment, this saved data is not used).

The predicting system 20 is provided with a consumption amount measurer 21 and a schedule information predictor 22. The consumption amount measurer 21 includes a power meter and a storage for saving measurement results of the power meter, and saves a change in a total power consumption amount which is a sum of the power consumption amounts of all the consuming apparatuses consuming power, i.e., the network-connected first consuming apparatuses 3, 4, 6 and the second consuming apparatus 9 which is not network-connected, as a power consumption pattern. The schedule information predictor 22 predicts a future power consumption pattern and a future consumption starting time (t2) in accordance with the power consumption pattern saved in the consumption amount measurer 21.

Specifically, if a power consumption state of each individual household is watched by the day, by the week or by the month, it is often found that power is consumed in a specified pattern. If all the power consuming apparatuses are network-connected and the operation schedule information is given through timer programming, the power consumption pattern is such as to set the operation starting time (t1) at a load starting time. However, since this embodiment includes at least the second consuming apparatus 9 which is not network-connected, the power consumption pattern is highly probably different from the one determined by the power consumption performances of only the first consuming apparatuses 3, 4, 6. In this way, the predicting system 20 obtains the power consumption pattern in accordance with an actual load state for all the power consuming apparatuses regardless of whether or they are network-connected or not, and predicts the consumption starting time (t2) in accordance with the power consumption pattern.

Figure 2:
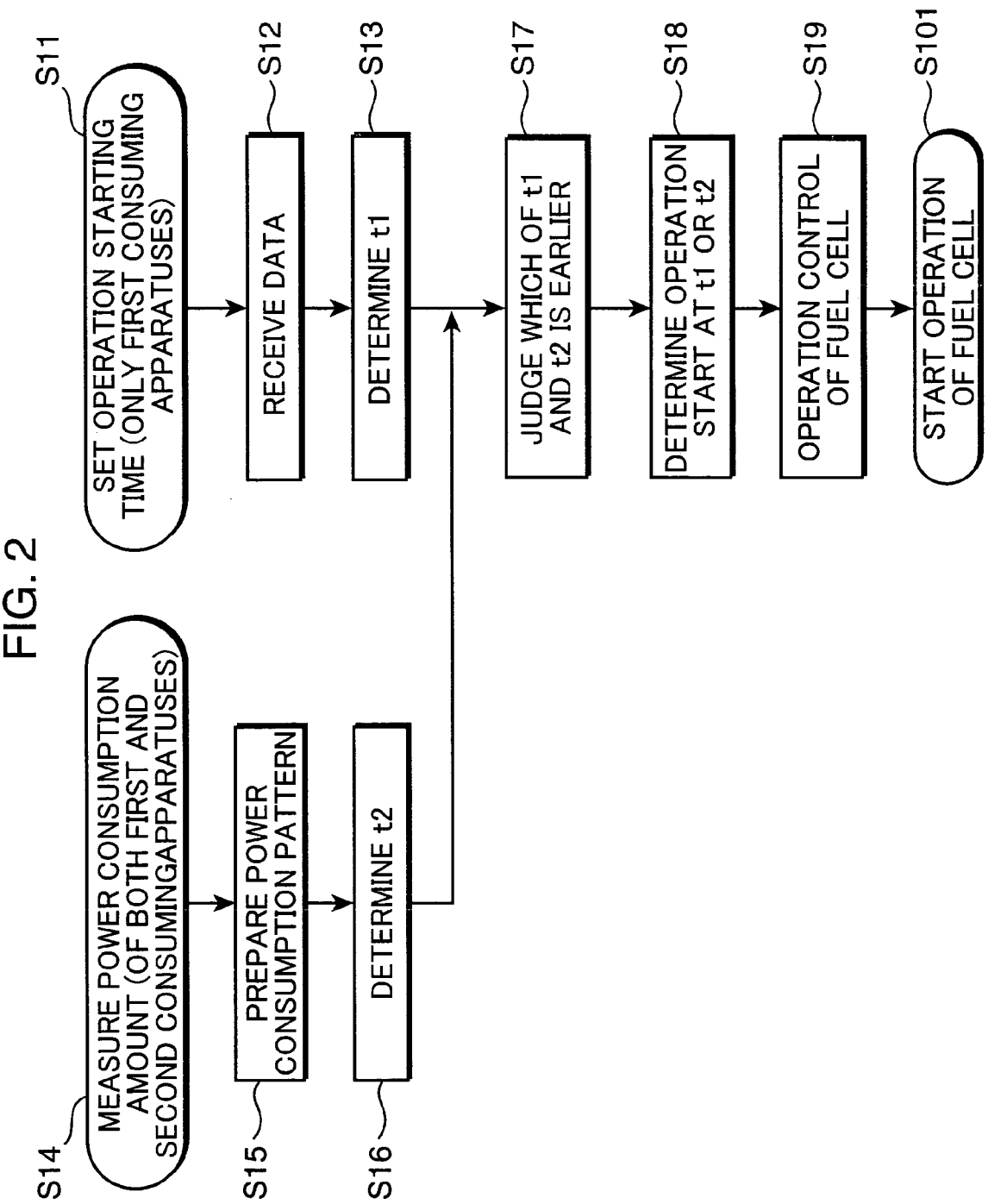
FIG. 2 is a flowchart showing the operation of the cogeneration system according to the first embodiment.

The operation of the cogeneration system according to this embodiment thus constructed is described with reference to a flowchart shown in FIG. 2.

In the first consuming apparatuses 3, 4, 6 network-connected with the control system 10 of the cogeneration facility CS (excluding the consuming apparatus 5 not consuming power), a user sets the operation starting times (and operation ending times) in the operation starting time setter 31, 41, 61 provided in the consuming apparatuses 3, 4, 6 (Step S11), wherein a data on the information concerning the set times (operation schedule information) is automatically transmitted to the control system 10 via the network NL.

Such an operation schedule information data is received by the schedule information receiver 12 of the control system 10 (Step S12). Specifically, in the case of individual general household, the operation starting time (and operation ending time) of the consuming apparatuses such as a washing/drying machine for which a user sets a timer is received. This time is sent to the operating condition determiner 13 as the operation starting time (t1) of the first consuming apparatuses (Step S13).

On the other hand, the consumption amount measurer 21 of the predicting system 20 measures the total power consumption amount of the first consuming apparatuses 3, 4, 6 and the second consuming apparatus 9 which is not net-connected at an interval of a specified period and accumulates the measured data (Step S14). A data accumulating period may be suitably determined in accordance with a control span. For example, if importance is attached to a load variation among morning, daytime, evening and night, it is desirable to accumulate 24-hour data for several days or longer. If importance is attached to a load variation between weekdays and weekends, it is desirable to accumulate week data for at least about 2 to 3 weeks. The power consumption pattern is generated based on the accumulated total power consumption amount in this way (Step S15), and the generated power consumption pattern is sent to the schedule information predictor 22. The schedule information predictor 22 predicts a future power consumption starting time in accordance with the received power consumption pattern and sends this time to the operating condition determiner 13 as the predicted consumption starting time (t2) of the first consuming apparatuses 3, 4, 6 and the second consuming apparatus 9 (Step S16).

The operating condition determiner 13 compares the operation starting time (t1) of the first consuming apparatus and the predicted consumption starting time (t2) predicted by the predicting system 20 and judges which of them is earlier (Step S17). If the operation starting time (t1) is earlier than the consumption starting time (t2), the operation starting time of the fuel cell 1 in the cogeneration facility CS is determined with priority given to the operation starting time (t1) (i.e., the operation starting time (t1) is set as the operation starting time of the fuel cell 1). Conversely, if the operation starting time (t1) is later than the consumption starting time (t2), the operation starting time of the fuel cell 1 in the cogeneration facility CS is determined with priority given to the consumption starting time (t2) (Step S18).

Subsequently, the fuel cell controller 14 determines a control condition of the fuel cell 1 in consideration of a starting condition such as a pre-heating period of a modifier provided in the fuel cell 1 so that the fuel cell 1 can stably generate power at the operation starting time of the fuel cell 1 determined in Step S18, and generates a corresponding control signal (Step S19). The start (end) of the operation of the fuel cell 1 is actually automatically controlled by this control signal (Step S101).

According to the cogeneration system as above, even if both the first consuming apparatuses 3, 4, 6 provided with the network connecting function and the second consuming apparatus 9 provided with no network connecting function exist, the operation starting time of the fuel cell 1 as the cogeneration facility CS can be determined in accordance with the actual load state, with the result that the merit of introducing the cogeneration facility can be sufficiently exhibited. For example, in the case that the second consuming apparatus 9 provided with no network connecting function is a large-capacity load, if the operation of the fuel cell 1 is controlled only in dependence on the operation schedule information of the first consuming apparatuses 3, 4, 6, there is a problem that the fuel cell 1 does not operate despite the fact that the second consuming apparatus 9 actually operates and needs a power supply support by the fuel cell 1 since the operation starting time of the first consuming apparatuses 3, 4, 6 is not reached yet. However, the inventive system has an advantage of not experiencing such a problem.

(Second Embodiment)

Figure 3:
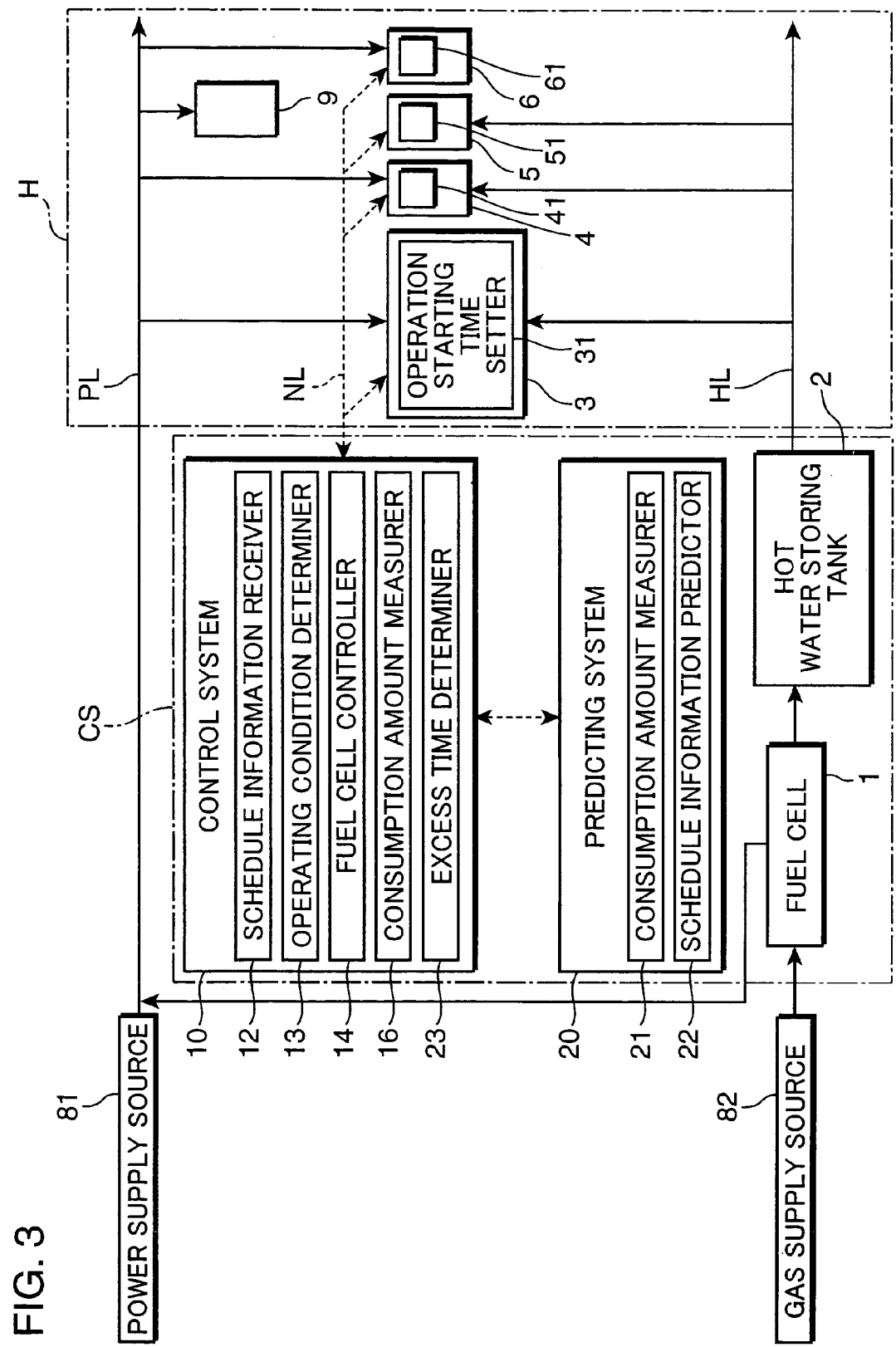
FIG. 3 is a block diagram showing an entire construction of a cogeneration system according to a second (and third) embodiment(s) of the invention.

FIG. 3 is a block diagram showing the entire construction of a cogeneration system according to a second embodiment of the present invention. The second embodiment differs from the first embodiment shown in FIG. 1 in that an excess time determiner 23 is added to the control system 10. No description is given on the other construction since it is same as in the first embodiment.

The excess time determiner 23 determines a time (t3), which is at or later than the operation starting time (t1) and at which the power consumption amount takes a specified value or larger, in accordance with the operation starting time (t1) of the first power consuming apparatuses 3, 4, 6 received by the schedule information receiver 12 and the power consumption amount during the past operation or the power consumption pattern of the first consuming apparatuses 3, 4, 6 saved in the consumption amount measurer 16. Specifically, instead of merely using the operation starting time (t1) of the first consuming apparatuses as a comparison factor, a point of time which is at or later than the start of the operation of the first consuming apparatuses 3, 4, 6 and at which a load state where a power supply support by the cogeneration facility CS is substantially necessary is reached is set as the first operation starting time (t3) of the cogeneration facility CS to be compared. In other words, a time at which the cogeneration facility CS should be started for the efficient operation is calculated back from an expected power consumption amount or power consumption pattern in accordance with the operation schedule information given from the first consuming apparatuses 3, 4, 6, and the thus obtained time is set as the operation starting time (t3) to be compared.

For example, a specified value X of a power and/or heat consumption amount for starting the operation of the cogeneration facility CS can be set beforehand in accordance with a generation amount variable range of power and/or heat of the cogeneration facility CS, and a time at which the power and/or heat consumption amount as the operation schedule information of the first consuming apparatuses 3, 4, 6 becomes equal to or above the specified value can be set as the operation starting time (t3). In this embodiment is shown an example in which the specified value X is set as a lower limit value of a power generation variable range of the fuel cell 1 in the cogeneration facility CS, and a time at which a power consumption amount calculated in accordance with the operation schedule information of the first consuming apparatuses 3, 4, 6 exceeds the above lower limit value is determined as the operation starting time (t3) of the fuel cell 1. It is preferable to set such a value as the specified value X since an actually unnecessary operation of the fuel cell 1 in such a state where the power consumption amount falls below the lower limit value of the power generation variable range of the fuel cell 1 can be avoided.

Instead of merely setting the consumption starting time (t2) based on the prediction of the total power and/or heat consumption of the first and second consuming apparatuses as another time to be compared, a time at which a load state where the power supply support by the cogeneration facility CS is substantially necessary is set as the second operation starting time (t4) of the cogeneration facility CS to be compared in accordance with the consumption prediction. The specified value X may be used in setting this second operation starting time (t4). In this embodiment is shown an example in which a time, at which a consumption amount predicted value given by the schedule information predictor 22 of the predicting system 20 exceeds the specified value X, is determined as the operation starting time (t4).

Specifically, the schedule information predictor 22 of this embodiment predicts the future power consumption pattern from the one saved in the consumption amount measurer 21 and further predicts the time (t4) at which the total future power consumption amount of the first consuming apparatuses 3, 4, 6 and the second consuming apparatus 9 becomes equal to or larger than the specified value X, which is the lower limit value of the power generation variable range of the fuel cell 1.

The operation of the cogeneration system according to this embodiment thus constructed is described with reference to a flowchart shown in FIG. 4.

A user sets the operation starting times (and operation ending times) in the operation starting time setter 31, 41, 61 provided in the consuming apparatuses 3, 4, 6 network-connected with the control system 10 of the cogeneration facility CS (Step S21), wherein a data on the information concerning the set times (operation schedule information) is automatically transmitted to the control system 10 via the network NL. Such an operation schedule information data is received by the schedule information receiver 12 of the control system 10 (Step S22). This operation schedule information is sent to the operating condition determiner 13 and is first recognized as the operation starting time (t1) of the first consuming apparatuses. The operation schedule information is also sent to the excess time determiner 23, in which the power consumption amount (or power consumption pattern) predicted for the case of operating the first consuming apparatuses 3, 4, 6 in accordance with such operation schedule information is calculated based on the power consumption amount during the past operation or power consumption pattern of the first consuming apparatuses 3, 4, 6 saved in the consumption amount measurer 16 (Step S23).

Subsequently, the excess time determiner 23 predicts the time at which the predicted power consumption amount exceeds the specified value X, i.e., the lower limit value of the power generation variable range of the fuel cell 1 of the cogeneration facility CS, based on the predicted power consumption amount calculated in Step S23 (Step S24). This time is determined as the first operation starting time (t3) of the cogeneration facility CS (fuel cell 1) set in accordance with only the operation schedule information of the first consuming apparatuses 3, 4, 6 (Step S25).

On the other hand, the consumption amount measurer 21 of the predicting system 20 measures the total power consumption amount of the first consuming apparatuses 3, 4, 6 and the second consuming apparatus 9, which is not network-connected, at an interval of a specified period and accumulates the data (Step S31). The power consumption pattern is generated based on the accumulated total power consumption amounts (Step S32). Although the operation is same as in the first embodiment up to this Step, the schedule information predictor 22 predicts a future power consumption pattern from the power consumption pattern saved in the consumption amount measurer 21 and further predicts a time at which a future total power consumption amount of the first consuming apparatuses 3, 4, 6 and the second consuming apparatus 9 exceeds the specified value X, i.e., the lower limit value of the power generation variable range of the fuel cell 1 in the second embodiment (Step S33). This time is determined as the second operation starting time (t4) of the cogeneration facility CS (fuel cell 1) set based on the prediction of the total consumption amount of the first consuming apparatuses 3, 4, 6 and the second consuming apparatus 9 (Step S34). The first operation starting time (t3) set in Step S25 and the second operation starting time (t4) set in Step S34 in this way are respectively sent to the operating condition determiner 13.

The operating condition determiner 13 compares the received first operation starting time (t3) and second operation starting time (t4) and judges which of them is earlier (Step S41). If the first operation starting time (t3) is earlier than the second operation starting time (t4), the operation starting time of the fuel cell 1 in the cogeneration facility CS is determined with priority given to the first operation starting time (t3) (i.e., the first operation starting time (t3) is set as the operation starting time of the fuel cell 1) (Step S42). Conversely, if the first operation starting time (t3) is later than the second operation starting time (t4), the operation starting time of the fuel cell 1 in the cogeneration facility CS is determined with priority given to the second operation starting time (t4) (Step S42).

Subsequently, the fuel cell controller 14 determines the control condition of the fuel cell 1 in view of a starting condition such as a pre-heating period of a modifier provided in the fuel cell 1 so that the fuel cell 1 can stably generate power at the operation starting time of the fuel cell 1 determined in Step S42, and generates a corresponding control signal (Step S43). The start (end) of the operation of the fuel cell 1 is actually automatically controlled by this signal (Step S44).

According to the cogeneration system as above, even if both the first consuming apparatuses 3, 4, 6 provided with the network connecting function and the second consuming apparatus 9 provided with no network connecting function exist, the operation starting time of the fuel cell 1 as the cogeneration facility CS can be determined in accordance with the actual load state, with the result that the merit of introducing the cogeneration facility can be sufficiently exhibited. In addition, since the start of the operation of the fuel cell as the cogeneration facility can be determined only when the power consumption amount is equal to or above the specified value, a reduction of the durability of the cogeneration facility CS caused by frequently repeating the start and the end of the operation can be suppressed. Further, useless operation in such a state where the power consumption amount falls below the lower limit value of the power generation variable range of the cogeneration facility CS (fuel cell 1) can be suppressed, thereby displaying an advantage that the cogeneration system can quite efficiently operate.

(Third Embodiment)

Figure 4:
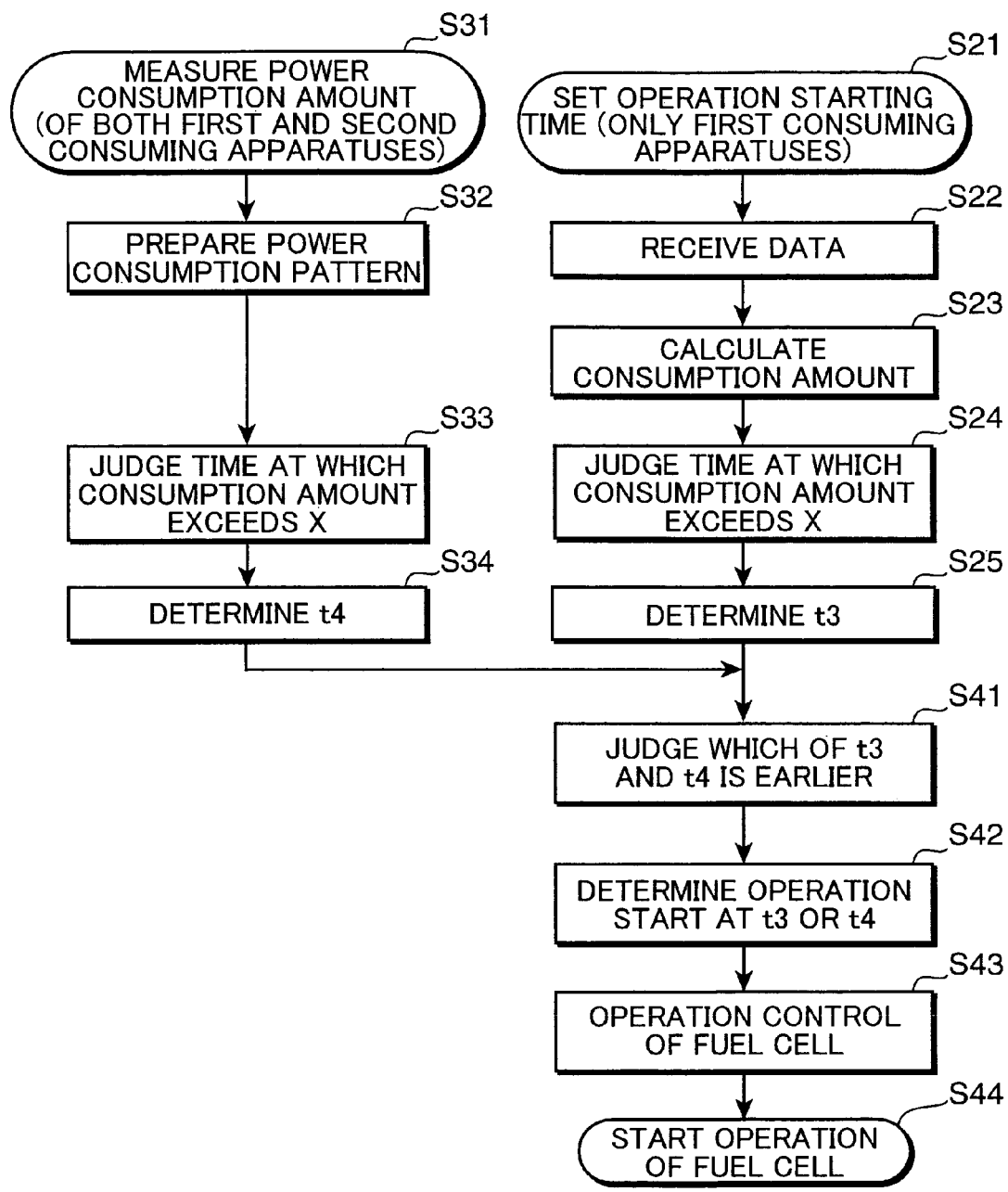
FIG. 4 is a flowchart showing the operation of the cogeneration system according to the second (and third) embodiment(s)

Here is described a cogeneration system according to a third embodiment of the present invention as a modification of the second embodiment shown in FIGS. 3 and 4.

Similar to the second embodiment, the excess time determiner 23 sets the time, at which the power consumption amount calculated in accordance with the operation schedule information of the first consuming apparatuses 3, 4, 6 exceeds the specified value X, e.g. the lower limit value of the power generation variable range of the fuel cell 1, as the first operation starting time (t3) in the third embodiment as well. On the other hand, the schedule information predictor 22 sets a time, at which the power consumption amount exceeds an increased specified value Y set to be larger than the specified value X, as the second operation starting time (t4). Specifically, a value obtained by adding a specific value to the lower limit value of the power generation variable range of the fuel cell 1 (e.g., value larger than the lower limit value by about 5 to 20%) is set as the increased specified value Y, and the time at which the total power consumption amount of the first consuming apparatuses 3, 4, 6 and the second consuming apparatus 9 predicted based on the power consumption pattern saved in the consumption amount measurer 21 exceeds the increased specified value Y is set as the second operation starting time (t4). The other construction is same as in the second embodiment.

A difference of the third embodiment to the second embodiment in the actual operation is that the schedule information predictor 22 predicts a future power consumption pattern from the power consumption pattern saved in the consumption amount measurer 21 and further predicts the time, at which a future total power consumption amount of the first consuming apparatuses 3, 4, 6 and the second consuming apparatus 9 exceeds the increased specified value Y, i.e., the value obtained by adding the specific value to the lower limit value of the power generation variable range of the fuel cell 1 in Step S33 of the flowchart shown in FIG. 4. This predicted time is set as the second operation starting time (t4) of the cogeneration facility CS (fuel cell 1) determined in accordance with the predicted total consumption amount of the first consuming apparatuses 3, 4, 6 and the second consuming apparatus 9, and the second operation starting time (t4) is sent to the operating condition determiner 13 in Step S34. Since the remaining part of the flow is same as in the case of the second embodiment, no description is given. Advantages of the third embodiment are as follows.

Since the operation starting time of the network-connected first consuming apparatuses 3, 4, 6 is received by the schedule information receiver 12 of the control system 10, the first operation starting time (t3) can be said to be determined with a relatively high precision. On the other hand, the second operation starting time (t4) obtained in dependence on the empirically obtained power consumption pattern including the power consumption of the second consuming apparatus 9 provided with no network connecting function is determined with a lower consumption predicting precision than the first operation starting time (t3). Accordingly, the value as a reference in determining the second operation starting time (t4) is set at the increased specified value Y larger than the specified value X, i.e., larger than the lower limit value of the power generation variable range of the fuel cell 1, whereby a risk of starting and operating the fuel cell 1 in a state where the power consumption amount falls below the lower limit value of the power generation variable range of the fuel cell 1 can be further reduced. In other words, the second operation starting time (t4) is set at a relatively later time at which the power consumption amount is larger by using the increased specified value Y larger than the specified value X. This leads to an increased probability of prioritizing the first operation starting time (t3) having a relatively higher precision in the comparison (Step S41) in the operating condition determiner 13. As a result, a probability of uselessly operating the fuel cell 1 can be advantageously suppressed to low.

(Fourth Embodiment)

Figure 5:
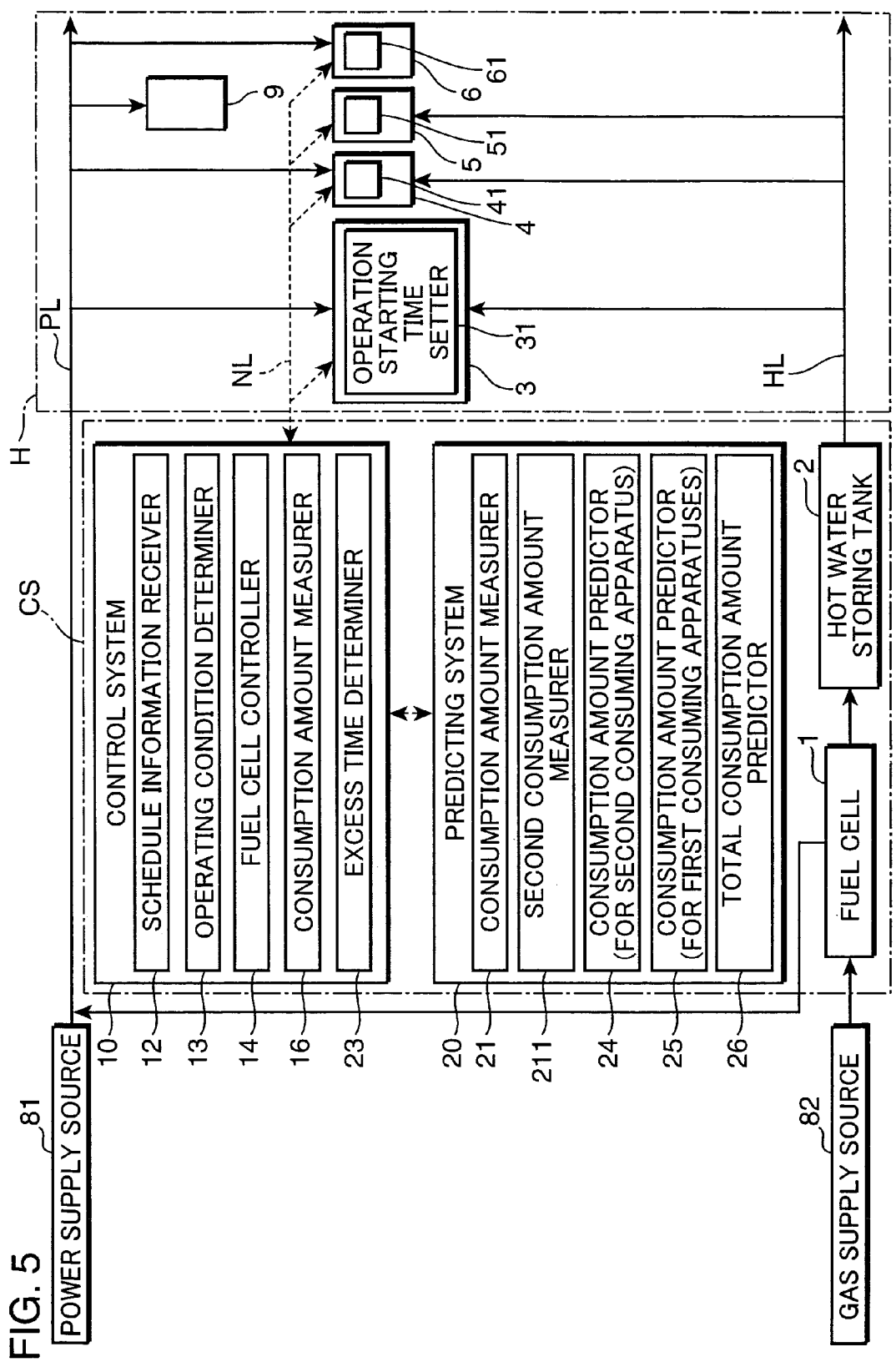
FIG. 5 is a block diagram showing an entire construction of a cogeneration system according to a fourth embodiment of the invention.
Figure 6:
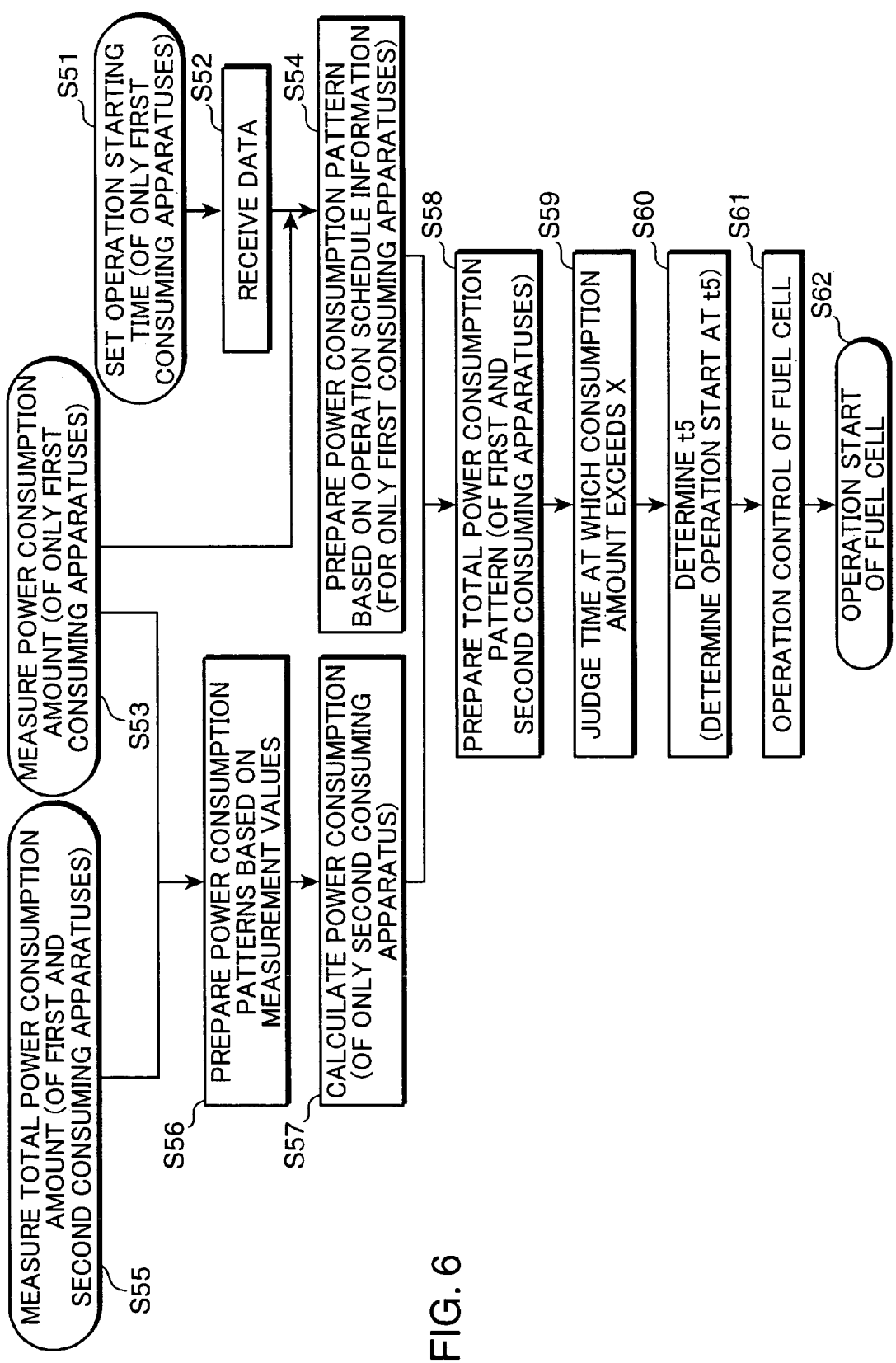
FIG. 6 is a flowchart showing the operation of the cogeneration system according to the fourth embodiment.

A cogeneration system according to a fourth embodiment of the present invention as a modification of the second embodiment is described with reference to FIGS. 5 to 8. FIG. 5 is a block diagram showing the entire construction of the cogeneration system according to the fourth embodiment of the invention; FIG. 6 is a flowchart showing the operation of the cogeneration system according to the fourth embodiment, and FIGS. 7 and 8 are histograms showing exemplary power consumption patterns.

The construction diagram of FIG. 5 differs from the embodiment shown in FIG. 3 in that a second consumption amount measurer 211, a consumption amount predictor 24 for the second consuming apparatus, a consumption amount predictor 25 for the first consuming apparatuses and a total consumption amount predictor 26 are added to the predicting system 20. The other construction is same as in the second embodiment.

Similar to the foregoing embodiments, the consumption amount measurer 21 predicts a future total power consumption pattern based on the total power consumption pattern of the first consuming apparatuses 3, 4, 6 and the second consuming apparatus 9 (calculates a total consumption amount predicted value A11). Further, the second consumption amount measurer 211 is additionally provided in the fourth embodiment for predicting a power consumption pattern of only the first consuming apparatuses 3, 4, 6 from the power consumption amount of the first consuming apparatuses 3, 4, 6 measured by the consumption amount measurer 16 (calculates a consumption amount predicted value A12 of the first consuming apparatuses). The consumption amount predicted value A12 here is a predicted value based on the past operation performances of the first consuming apparatuses 3, 4, 6.

The consumption amount predictor 24 for the second consuming apparatus predicts a power consumption pattern of only the second consuming apparatus 9 by subtracting the power consumption amount predicted value A12 of only the first consuming apparatuses 3, 4, 6 measured by the second consumption amount measurer 211 from the power consumption amount predicted value A11 as a sum of the power consumption amounts of the first and second consuming apparatuses measured by the consumption amount measurer 21 (calculates a consumption amount predicted value A13 of the second consuming apparatus) and saves it. The consumption amount predicted value A13 here is a predicted value based on the past operation performance of the second consuming apparatus 9.

The consumption amount predictor 25 for the first consuming apparatuses calculates a power consumption pattern predicted for the case of operating the first consuming apparatuses 3, 4, 6 in accordance with the operation schedule information of the first consuming apparatuses 3, 4, 6 received by the operation information receiver 12 based on such operation schedule information and the power consumption amounts during the past operations of the first consuming apparatuses 3, 4 6 saved in the consumption amount measurer 16 (calculates a consumption amount predicted value A14 based on the operation schedule information of the first consuming apparatuses). Since the first consuming apparatuses 3, 4, 6 can automatically transmit the operation information of their own, the power consumption amounts thereof can be estimated based on the power consumption patterns without depending on actual measurements. Accordingly, estimated values calculated from the power consumption patterns obtained from the operation schedule information received by the operation information receiver 12 may be used without depending on the power consumption amounts of the first consuming apparatuses 3, 4, 6 measured by the consumption amount measurer 16.

The total consumption amount predictor 26 adds the power consumption pattern of only the second consuming apparatus 9 predicted by the consumption amount predictor 24 (consumption amount predicted value A13) and the power consumption pattern predicted for the case of operating the first consuming apparatuses 3, 4, 6 by the consumption amount predictor 25 (consumption amount predicted value A14), thereby calculating a total power consumption pattern of the first and second consuming apparatuses (total consumption amount predicted value A15).

The operation of the cogeneration system according to this embodiment thus constructed is described with reference to a flowchart shown in FIG. 6.

A user sets the operation starting times (and/or operation ending times) in the operation starting time setter 31, 41, 61 provided in the consuming apparatuses 3, 4, 6 network-connected with the control system 10 of the cogeneration facility CS or a controller (not shown) for remotely controlling the operations of the first consuming apparatuses 3, 4, 6 sets the operation starting times (and/or operation ending times) (Step S51), wherein a data on the information concerning the set times (operation schedule information) is automatically transmitted to the control system 10 via the network NL. Such an operation schedule information data is received by the schedule information receiver 12 of the control system 10 (Step S52). This operation schedule information is sent to the operating condition determiner 13 to be recognized as the operation starting time (t1) of the first consuming apparatuses.

On the other hand, the consumption amount measurer 16 of the control system 10 measures the power consumption amounts of the first consuming apparatuses 3, 4, 6 and saves measurement information (Step S53). The consumption amount predictor 25 for the first consuming apparatuses calculates the power consumption pattern predicted for the case of operating the first consuming apparatuses 3, 4, 6 in accordance with the operation schedule information given to the schedule information receiver 12 based on the power consumption amounts during the past operations of the first consuming apparatuses 3, 4, 6 measured and saved in the consumption amount measurer 16 (or estimated values based on the power consumption pattern) and such operation schedule information (Step S54: power consumption amount predicted value A14 is calculated in accordance with the operation schedule information of the first consuming apparatuses).

The consumption amount measurer 21 of the predicting system 20 measures the total power consumption amount of the first consuming apparatuses 3, 4, 6 and the second consuming apparatus 9, which is not network-connected, at an interval of a specified period, and saves this measurement information (Step S55). In succeeding Step S56, the second consumption amount measurer 221 calculates the power consumption pattern predicted value (power consumption amount predicted value A12 of the first consuming apparatuses) based on the measurement values of only the first consuming apparatuses 3, 4, 6 in accordance with the measurement information obtained in Step S53. Further, the consumption amount measurer 21 calculates the total power consumption pattern predicted value of the first consuming apparatuses 3, 4, 6 and the second consuming apparatus 9 in accordance with the measurement information obtained in Step S55.

Subsequently, the consumption amount predictor 24 for the second consuming apparatus calculates the power consumption pattern predicted value of only the second consuming apparatus 9 (consumption amount predicted value A13 of the second consuming apparatus) by subtracting the power consumption amount predicted value A12 of only the first consuming apparatuses 3, 4, 6 obtained by the second consumption amount measurer 211 from the total power consumption amount predicted value A11 obtained by the consumption amount measurer 21, and saves the calculated value (Step S57).

Thereafter, the total consumption amount predictor 26 adds the power consumption amount predicted value A14 based on the operation schedule information of the first consuming apparatuses 3, 4, 6 obtained by the consumption amount predictor 25 for the first consuming apparatuses and the power consumption amount predicted value A13 of the second consuming apparatus 9 obtained by the consumption amount predictor 24 for the second consuming apparatus to calculate the total power consumption pattern predicted value (total consumption amount predicted value A15) of the first consuming apparatuses 3, 4, 6 and the second consuming apparatus 9 (Step S58). Such an addition is a characterizing feature of this embodiment. In other words, the first consuming apparatuses 3, 4, 6 capable of predicting the substantial consumption on the day of the operation because of their ability to automatically transmitting the operation information of their own to the control system 10 and the second consuming apparatus 9 obliged to have its consumption predicted based on the past operation data are separately considered, and finer setting can be made for the operation starting time of the cogeneration facility CS using the power consumption amount predicted value A14 based on the operation schedule information having a higher reliability for the first consuming apparatuses 3, 4, 6. This point is described in detail later.

Subsequently, the excess time determiner 23 calculates the time, at which the predicted total power consumption amount of the first consuming apparatuses 3, 4, 6 and the second consuming apparatus 9 exceeds the specified value X, i.e., the lower limit value of the power generation variable range of the fuel cell 1 of the cogeneration facility CS, based on the predicted total power consumption pattern (total consumption amount predicted value A15) of the first consuming apparatuses 3, 4, 6 and the second consuming apparatus 9 obtained by the total consumption amount predictor 26 in Step S58 (Step S59). The thus calculated time is set as an operation starting time (t5) of the cogeneration facility CS (fuel cell 1) (Step S60). In other words, this operation starting time (t5) is determined as the operation starting time of the fuel cell 1.

The fuel cell controller 14 determines the control condition of the fuel cell 1 in view of a starting condition such as a pre-heating period of a modifier provided in the fuel cell 1 so that the fuel cell 1 can stably generate power at the operation starting time of the fuel cell 1 determined in Step S60, and generates a corresponding control signal (Step S61). The start (end) of the operation of the fuel cell 1 is actually automatically controlled by this signal (Step S62).

Various power consumption patterns used in the above flow are described in detail with reference to FIGS. 7A to 7E. In the histograms of FIGS. 7A to 7E, horizontal and vertical axes represent time and predicted power consumption amount, respectively.

First, FIG. 7A shows an exemplary predicted power consumption pattern (predicted power consumption pattern generated in Step S32 of the flowchart of FIG. 4) generated by the schedule information predictor 22 (see FIG. 3) in the second embodiment described above. This power consumption pattern is predicted by the schedule information predictor 22 based on the sum of the power consumption amounts of the first consuming apparatuses 3, 4, 6 and the power consumption amount of the second consuming apparatus 9, which is not network-connected, which were measured and accumulated at an interval of a specified period by the consumption amount measurer 21. Such a power consumption pattern is substantially the same as the power consumption pattern predicted in Step S56 (total consumption amount predicted value A11) based on the measurement information obtained in Step S55 (see FIG. 6) of the fourth embodiment.

FIG. 7B shows an exemplary predicted power consumption pattern (power consumption pattern generated in Step S23 of the flowchart of FIG. 4) generated by the excess time determiner 23 (see FIG. 3) also in the second embodiment. This power consumption pattern is predicted by the excess time determiner 23 based on the operation starting time (t1) of the first power consuming apparatuses 3, 4, 6 received by the schedule information receiver 12 and the power consumption amounts (or power consumption patterns) during the past operations of the first consuming apparatuses 3, 4, 6 saved in the consumption amount measurer 16. Such a power consumption pattern is substantially the same as the power consumption pattern predicted in Step S54 (consumption amount predicted value A14 based on the operation schedule information of the first consuming apparatuses) (see FIG. 6) of the fourth embodiment.

According to the second embodiment, the time at which the power consumption amount exceeds the specified value X is time T3 (corresponding to the second operation starting time t4 in the second embodiment) in the power consumption pattern of FIG. 7A while being time T4 (corresponding to the first operation starting time t3 in the second embodiment) in the power consumption pattern of FIG. 7B. Since time T4 is later than time T3 in this case, the operation starting time of the fuel cell 1 is determined with priority given to time T3 (see Steps S41, S42 of FIG. 4).

If the breakdown of the power consumption pattern shown in FIG. 7A is expressed over time, it is as shown in FIG. 7C. Specifically, as shown in FIG. 7C, the consumption amount predicted value at each time is comprised of a power consumption amount part (hatched part) of the first consuming apparatuses 3, 4, 6 and a power consumption amount part (outlined part) of the second consuming apparatus 9 which is not network-connected. Now, if attention is paid to time T3, the power consumption amount part (hatched part) of the first consuming apparatuses is based not on the operation schedule information of the day of operation, but on the consumption amount predicted value A12 obtained from the past operation performance. Therefore, prediction precision is relatively low.

Here, if the power consumption amount predicted value A12 of the first consuming apparatuses out of the power consumption amount at time T3 of FIG. 7C is larger than the power consumption amount (power consumption amount predicted value A14) of the first consuming apparatuses at time T3 of FIG. 7B, time T3 may be judged to be the operation starting time of the fuel cell 1 despite the fact that the total power consumption amount of the first consuming apparatuses 3, 4, 6 and the second consuming apparatus 9 actually falls below the specified value X at time T3 (see FIG. 7E). In other words, there is a possibility of uselessly operating the cogeneration facility CS in such a state where the power consumption amount falls below the lower limit value of the power generation variable range of the cogeneration facility CS.

However, according to the fourth embodiment, the power consumption pattern of only the second consuming apparatus 9 (power consumption amount predicted value A13 obtained in Step S57 of FIG. 6) as shown in FIG. 7D is obtained by the consumption amount predictor 24 by subtracting the power consumption amount predicted value A12 from the power consumption pattern of FIG. 7C (total power consumption amount predicted value A11). A total power consumption pattern (total power consumption amount predicted value A15) as shown in FIG. 7E is obtained by the total consumption amount predictor 26 by adding the power consumption amount predicted value A13 and the power consumption pattern of the first consuming apparatuses 3, 4, 6 in accordance with the operation schedule information shown in FIG. 7B (power consumption amount predicted value A14 obtained in Step S54 of FIG. 6).

If attention is paid to the total power consumption amount predicted value A15 at time T3 in FIG. 7E, the predicted value A15 does not exceed the specified value X. Thus, there is no chance of judging time T3 as the operation starting time (t5). Time T4 at which a sum of the power consumption amount of the first consuming apparatuses in accordance with the operation schedule information and the power consumption amount of only the second consuming apparatus exceeds the specified value X is judged as the operation starting time (t5) in the fourth embodiment (Step S60 of FIG. 6). Accordingly, as compared to the second embodiment, finer setting can be made for the operation starting time of the cogeneration facility CS.

FIGS. 8A to 8E are histograms showing other examples of various power consumption patterns. FIGS. 8A to 8E correspond to FIGS. 7A to 7E, respectively, and the respective power consumption patterns are substantially analogous to the corresponding ones. A particular difference between these figures is that the power consumption amount part (hatched part) of the first consuming apparatuses at time T3, i.e., the consumption amount predicted value A12 based on the past operation performance does not exceed the specified value X in FIG. 8C. Even in such a case, according to the second embodiment, the cogeneration facility CS starts operating if a sum (i.e., power consumption amount predicted value A11 shown in FIG. 8A) of this consumption amount predicted value A12 and the power consumption amount predicted value A13 of only the consuming apparatus 9 shown in FIG. 8D exceeds the specified value X.

Figure 8A:
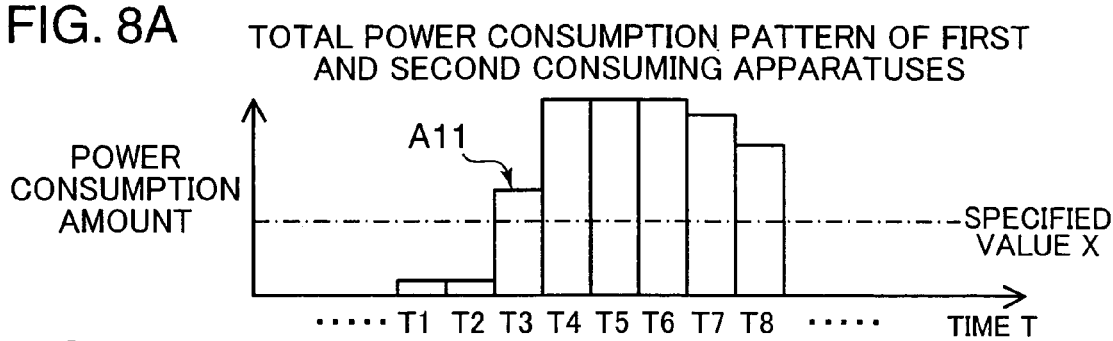
FIGS. 8A to 8E are histograms showing another exemplary power consumption pattern.
Figure 8B:
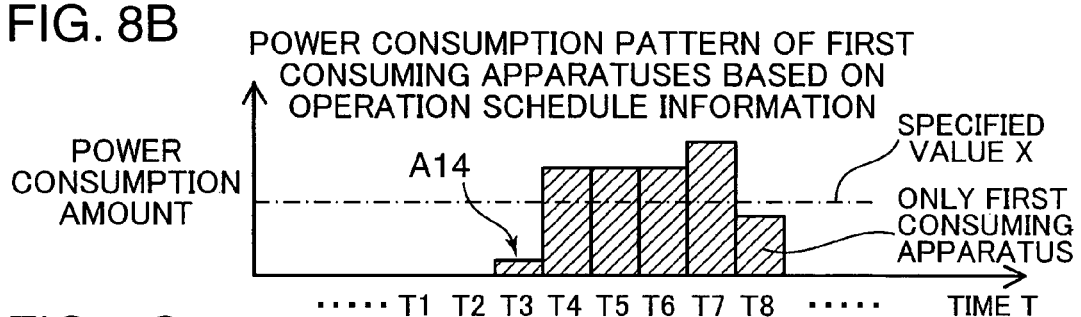
Figure 8C:
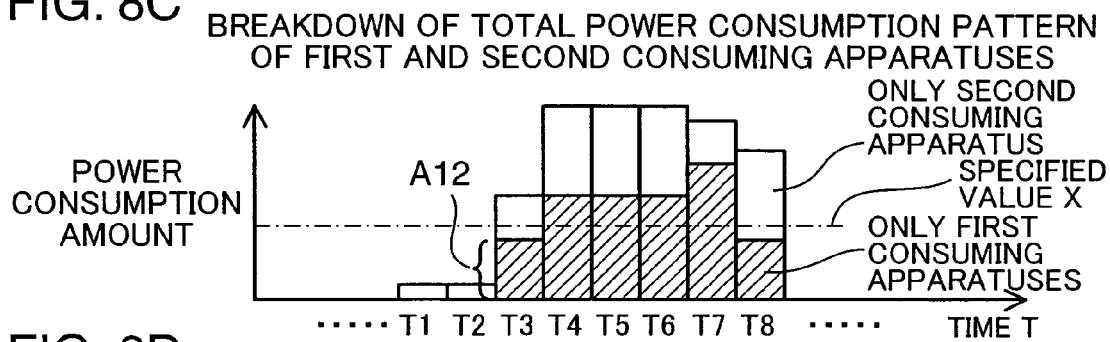
Figure 8D:
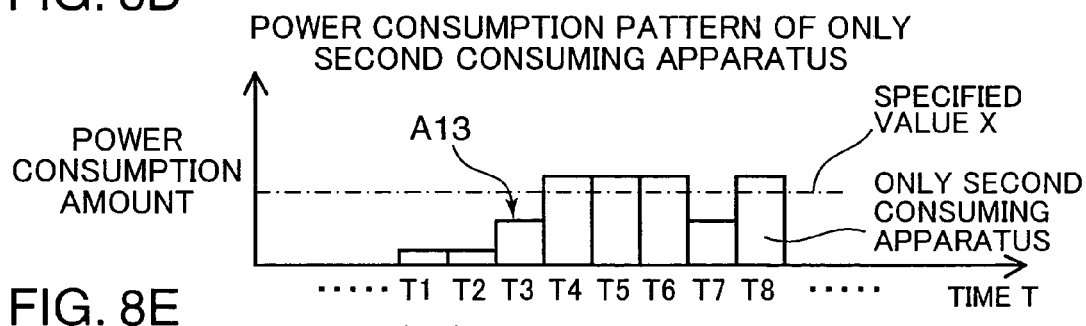
Figure 8E:
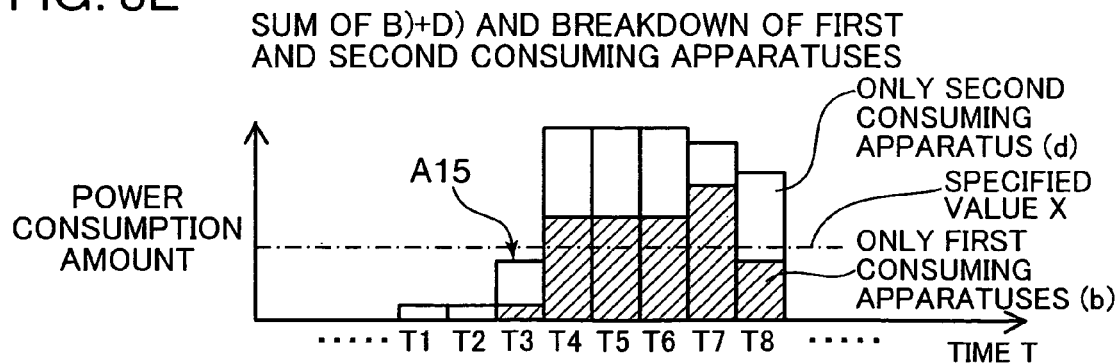

However, according to the judging technique of the fourth embodiment, the power consumption amount predicted value A13 of only the consuming apparatuses 9 as shown in FIG. 8D is similarly obtained by subtracting the power consumption amount predicted value A12 from the power consumption pattern of FIG. 8C (total power consumption amount predicted value A11), and the total power consumption amount predicted value A15 as shown in FIG. 8E is obtained by adding this power consumption amount predicted value A13 and the power consumption amount predicted value A14 of the first consuming apparatuses 3, 4, 6 in accordance with the operation schedule information shown in FIG. 8B.

If attention is paid to the total power consumption amount predicted value A15 at time T3 in FIG. 8E, the predicted value A15 does not exceed the specified value X. Thus, there is no chance of judging time T3 as the operation starting time (t5). Time T4 at which the total power consumption amount predicted value exceeds the specified value X is judged as the operation starting time (t5). Accordingly, as compared to the second embodiment, finer setting can be similarly made for the operation starting time of the cogeneration facility CS.

FIG. 9 is a table summarizing differences in the setting of the operation starting time of the cogeneration facility CS between the second and fourth embodiments described above. In FIG. 9, "Network Household Electric Apparatus" means the first consuming apparatuses and "Non-Network Household Electric Apparatus" means the second consuming apparatus. As shown in FIG. 9, in the second embodiment, the "operation start" of the cogeneration facility CS is determined when either the total power consumption amount predicted value predicted from the total power consumption amount measurement value of the first and second consuming apparatuses (corresponding to the power consumption amount predicted value A11 of the fourth embodiment) or the power consumption amount predicted value based on the operation schedule information of the first consuming apparatuses (corresponding to the power consumption amount predicted value A14 of the fourth embodiment) exceeds the specified value X.

On the other hand, in the fourth embodiment, the power consumption amount predicted value A13 corresponding to the second consuming apparatus is obtained by subtracting the power consumption amount predicted value A12 corresponding to the first consuming apparatuses from the total power consumption amount predicted value A11, and the "operation start" of the cogeneration facility CS is judged when the total power consumption amount predicted value A15 obtained by adding the power consumption amount predicted value A13 and the power consumption amount predicted value A14 in accordance with the operation schedule information of the first consuming apparatuses exceeds the specified value X.

As a result, the "operation start" is judged for all the cases excluding case 10 where both power consumption amount predicted values A11 and A14 fall below the specified value X according to the technique of the second embodiment, whereas a judgment that "the operation start is not necessary" is made for case 4 (power consumption patterns of FIGS. 7A to 7E) and case 8 (power consumption patterns of FIGS. 8A to 8E) in addition to case 10 according to the technique of the fourth embodiment since the total power consumption amount predicted value A15 reflecting, for example, the operation schedule information of the day actually set for the first consuming apparatuses is used as a judgment criterion. In this way, the efficient operation of the cogeneration facility CS can be sufficiently performed even according to the technique of the second embodiment, but a finer control can be made for the operation of the cogeneration facility CS according to the technique of the fourth embodiment.

Thus, according to the cogeneration system of the fourth embodiment, even if both the first consuming apparatuses 3, 4, 6 provided with the network connecting function and the second consuming apparatus 9 provided with no network connecting function exist, the operation starting time of the fuel cell 1 as the cogeneration facility CS can be finely determined in accordance with the actual load state (more finely than the second embodiment), with the result that the merit of introducing the cogeneration facility can be sufficiently exhibited. In addition, since the operation start of the fuel cell 1 as the cogeneration facility CS can be determined only when the power consumption amount is equal to or above the specified value, a reduction of the durability of the cogeneration facility CS caused by frequently repeating the start and the end of the operation can be suppressed. Further, useless operation in the state where the power consumption amount falls below the lower limit value of the power generation variable range of the cogeneration facility CS (fuel cell 1) can be suppressed, thereby displaying an advantage that the cogeneration system can quite efficiently operate.

(Fifth Embodiment)

Figure 10:
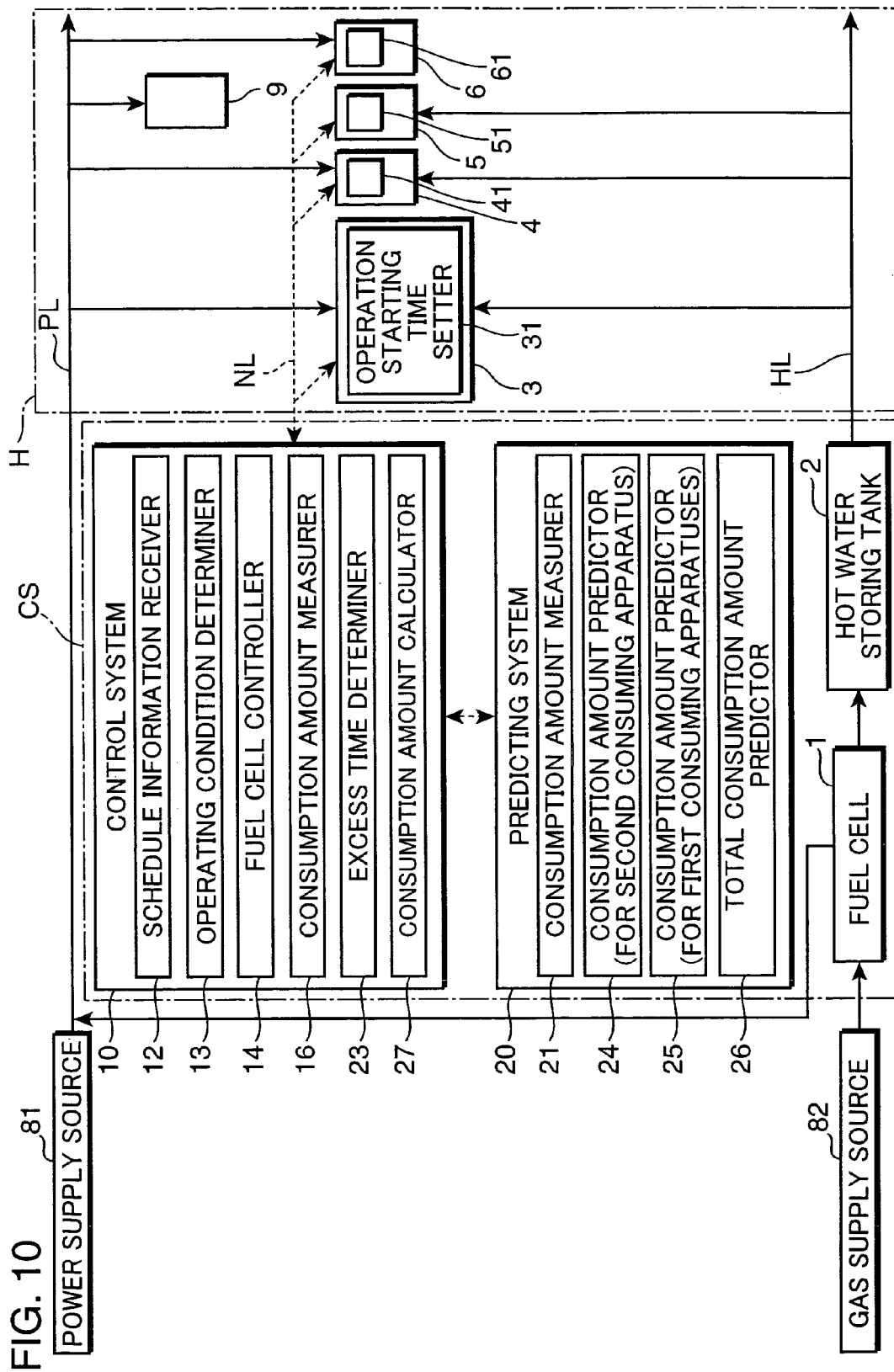
FIG. 10 is a block diagram showing an entire construction of a cogeneration system according to a fifth embodiment of the invention.
Figure 11:
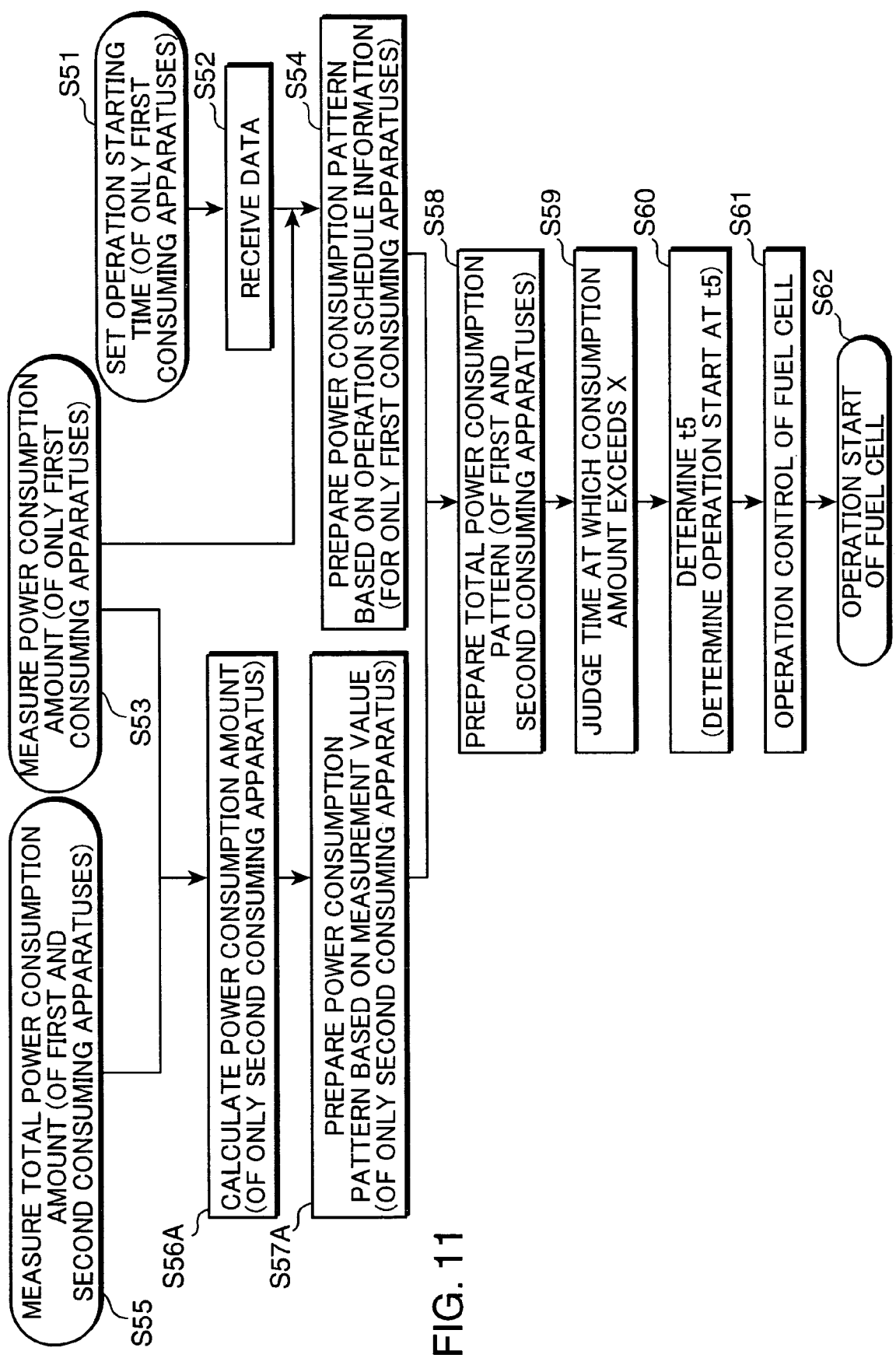
FIG. 11 is a flowchart showing the operation of the cogeneration system according to the fifth embodiment.

A cogeneration system according to a fifth embodiment of the present invention as a modification of the fourth embodiment is described with reference to FIGS. 10 and 11. FIG. 10 is a block diagram showing the entire construction of the cogeneration system according to the fifth embodiment and FIG. 11 is a flowchart showing the operation of this cogeneration system.

The construction diagram of FIG. 10 differs from the block diagram of FIG. 5 showing the fourth embodiment in that a consumption amount calculator 27 for calculating a power consumption amount of only the second consuming apparatus 9 is added to the control system 10, the second consumption amount measurer 211 is omitted from the predicting system 20 and the consumption amount predictor 24 for the second consuming apparatus functions differently from the second embodiment 4. The following description is centered on these differences.

The consumption amount calculator 27 calculates a power consumption amount actually consumed by the second consuming apparatus 9 (A21–A22) by subtracting the power consumption amount (consumption amount measurement value A22 of the first consuming apparatuses) of the first consuming apparatuses 3, 4, 6 measured by the consumption amount measurer 16 from an actual measurement value (total consumption amount measurement value A21) of the total power consumption amount of the first and second consuming apparatuses 3, 4, 6, 9.

The consumption amount predictor 24 for the second consuming apparatus in this embodiment calculates a power consumption amount predicted value A23 of only the second consuming apparatus 9 based on the power consumption amount (A21–A22). In other words, a power consumption pattern of the second consuming apparatus 9 can be obtained based on the past operation performance and the like from the actual measurement value of the power consumption amount of the second consuming apparatus 9.

Similar to the fourth embodiment, the consumption amount predictor 25 for the first consuming apparatuses calculates a power consumption pattern predicted for the case, where the first consuming apparatuses 3, 4, 6 are operated in accordance with the operation schedule information of the first consuming apparatuses 3, 4, 6 received by the operation information receiver 12, based on such operation schedule information and the power consumption amounts of the first consuming apparatuses 3, 4, 6 during the past operations saved in the consumption amount measurer 16 (calculates a power consumption amount predicted value A24 in accordance with the operation schedule information of the first consuming apparatuses). In this embodiment as well, an estimated value calculated from the power consumption pattern obtained from the operation schedule information received by the operation information receiver 12 may be used without using the actual measurement value. Further, the total consumption amount predictor 26 calculates a total power consumption amount predicted value A25 which is a sum of the aforementioned power consumption amount predicted values A23 and A24.

FIG. 11 is the flowchart showing the operation of the cogeneration system according to the fifth embodiment thus constructed. This flowchart differs from the one shown in FIG. 6 in that Steps S56 and S57 of FIG. 6 are replaced by Step S56A in which the power consumption amount of the second consuming apparatus 9 is obtained from an actual measurement value, and Step S57A in which the power consumption pattern of the second consuming apparatus 9 is generated from the actual measurement value obtained in Step S56A, respectively. Since the remaining part of the flow is same as in FIG. 6, only differences are described in order to avoid the repeated description.

In Step S53, the consumption amount measurer 16 of the control system 10 measures the power consumption amount of the first consuming apparatuses 3, 4, 6 (consumption amount measurement value A22 of the first consuming apparatuses) and saves this measurement information. In Step S55, the consumption amount measurer 21 of the predicting system 20 measures the total power consumption amount of the first and second consuming apparatuses 3, 4, 6, 9 (total consumption amount measurement value A21) at an interval of a specified period and saves this measurement information. These operations are same as in the fourth embodiment.

Subsequently, the consumption amount calculator 27 calculates the power consumption amount actually consumed by the second consuming apparatus 9 by applying subtraction to the above actual measurement values. In other words, the actually measured power consumption amount (A21–A22) is calculated by subtracting the consumption amount measurement value A22 of the first consuming apparatuses from the total consumption amount measurement value A21 (Step S56).

Then, the consumption amount predictor 24 calculates the power consumption pattern of the second consuming apparatus 9 (power consumption amount predicted value A23 of only the second consuming apparatus 9) from the actually measured power consumption amount of the second consuming apparatus 9 (A21–A22) obtained in Step S56A (Step S57A). Such a power consumption pattern is calculated, for example, based on the past operation performance.

The following operation is performed similar to the fourth embodiment. Specifically, the total consumption amount predictor 26 calculates the total power consumption amount predicted value A25 by adding the thus obtained power consumption amount predicted value A23 and the power consumption amount predicted value A24 in accordance with the operation schedule information of the first consuming apparatuses obtained by the consumption amount predictor 25 (Step S58). Then, the time at which this total power consumption amount predicted value A25 exceeds the specified value X is set as the operation starting time (t5) of the cogeneration facility CS. In this way, similar to the fourth embodiment, a finer control can be made for the operation of the cogeneration facility CS in the fifth embodiment as well.

(Sixth Embodiment)

A cogeneration system according to a sixth embodiment as a modification of the fourth or fifth embodiment is described.

In this embodiment, the excess time determiner 23 (see FIGS. 5 and 10) changes a specified value of the power and/or heat consumption amount for starting the operation of the cogeneration facility CS in accordance with the power consumption amount predicted value (A14 or A24) of the first consuming apparatuses 3, 4, 6 predicted based on the operation schedule information of the first consuming apparatuses 3, 4, 6. In other words, the specified value for starting the operation of the cogeneration facility CS is set at the above "specified value X" if the power consumption amount predicted value (A14 or A24) is equal to or above the specified value X (e.g. lower limit value of the power generation variable range of the fuel cell 1).

If the power consumption amount predicted value (A14 or A24) is 0, the specified value for starting the operation of the cogeneration facility CS is set at an "increased specified value Y" larger than the specified value X by a predetermined amount. Further, if the power consumption amount predicted value (A14 or A24) is larger than 0, but below the specified value X, the specified value is set at an intermediate specified value Z (where $X \leq Z \leq Y$) in accordance with the power consumption amount predicted value (A14 or A24). The other construction is similar to the fourth or fifth embodiment.

A difference in operation to the fourth or fifth embodiment is that, in Step S59 of the flowchart shown in FIGS. 6 and 11, the excess time determiner 23 calculates the time, at which the total power consumption amount predicted value (A15 or A25) exceeds the "specified value X", the "increased specified value Y" or the "intermediate specified value Z (where $X \leq Z \leq Y$)" set in accordance with the power consumption amount predicted value (A14 or A24) as described above, based on the predicted total power consumption pattern (total consumption amount predicted value A15 or A25) of the first and second consuming apparatuses 3, 4, 6, 9 obtained by the total consumption amount predictor 26 in Step S58. The time obtained by such a calculation is set as the operation starting time (t5) of the cogeneration facility CS (fuel cell 1) (Step S60). In other words, the operation starting time (t5) is determined as the operation starting time of the fuel cell 1. The remaining part of the flow is same as in the fourth or fifth embodiment.

Advantages of the sixth embodiment are as follows. Since the operation starting time of the network-connected first consuming apparatuses 3, 4, 6 is received by the schedule information receiver 12 of the control system 10, the first operation starting time (t5) can be said to be determined with a relatively high precision if the power consumption amount predicted value (A14 or A24) is equal to or above the specified value X (e.g. lower limit value of the power generation variable range of the fuel cell 1). On the other hand, the operation starting time (t5) is obliged to be calculated based on the empirically obtained power consumption pattern if the power consumption amount predicted value (A14 or A24) is 0 (i.e., if only the power consumption of the second consuming apparatus 9 having no network connecting function is expected). Accordingly, the precision of the operation starting time (t5) is reduced as compared to the case where the power consumption amount predicted value (A14 or A24) is equal to or above the specified value X.

In view of the above, upon determining the operation starting time (t5) when the power consumption amount predicted value of the network-connected first consuming apparatuses 3, 4, 6 (A14 or A24) is 0, a reference value is set at the "increased specified value Y" larger than the specified value X by the predetermined amount, i.e., value larger than the lower limit value of the power generation variable range of the fuel cell 1, thereby further reducing a risk of starting and operating the fuel cell 1 in such a state where the power consumption amount falls below the lower limit value of the power generation variable range. In other words, by using the increased specified value Y larger than the specified value X, the operation starting time (t5) set in the case that the power consumption amount predicted value (A14 or A24) of the network-connected consuming apparatuses 3, 4, 6 is 0 is set at a relatively later time at which more power is consumed. Thus, there is an advantage of further reducing a possibility of uselessly operating the fuel cell 1.

Figure 12:
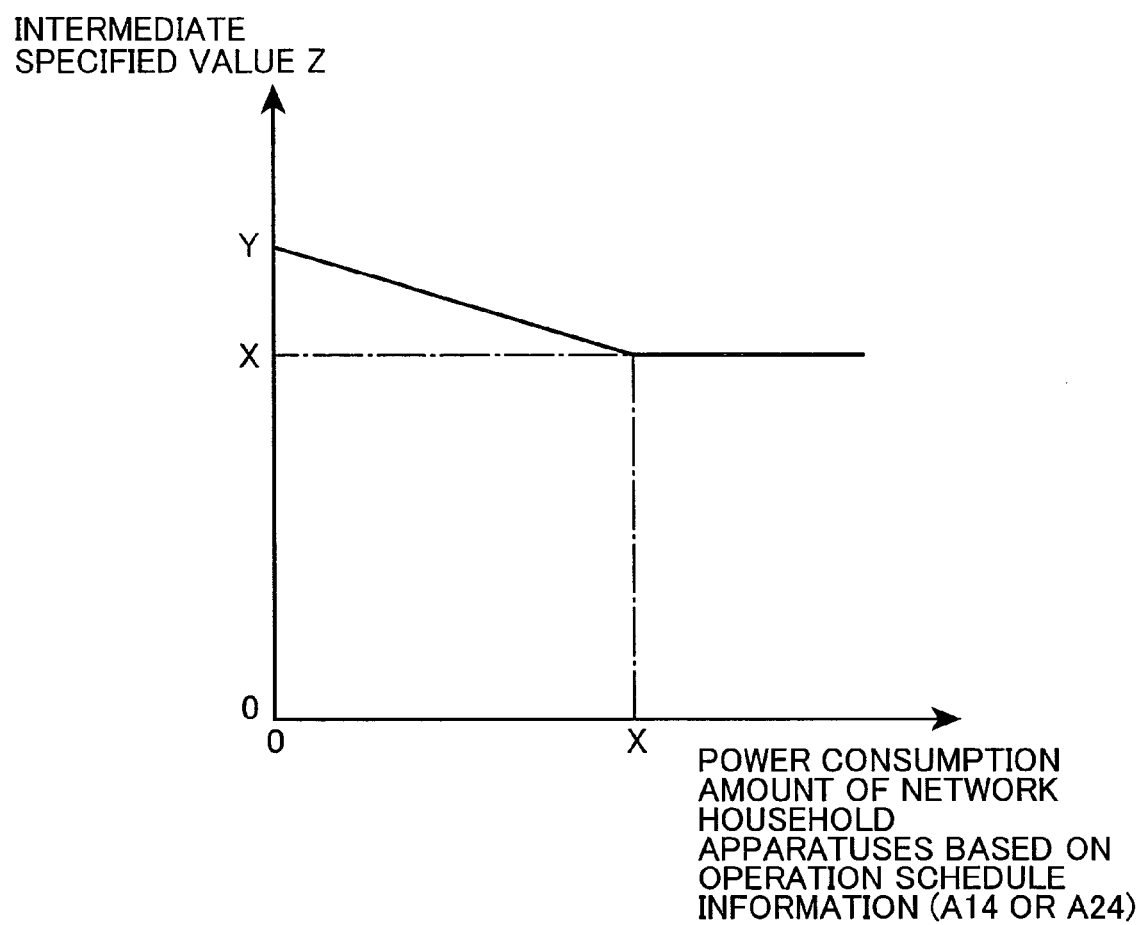
FIG. 12 is a graph showing one exemplary technique of setting a power and/or heat consumption amount at a specified value for starting the operation of a cogeneration facility CS.

Further, if the power consumption amount predicted value (A14 or A24) is larger than 0, but below the specified value X, as shown in FIG. 12, the specified value of the power and/or heat consumption amount for starting the operation of the cogeneration facility CS is set at such an intermediate specified value Z (where $X \leq Z \leq Y$) as to linearly or changelessly decrease from the specified value Y to the specified value X as the power consumption amount predicted value (A14 or A24) increases from 0 toward the specified value X. By using such an intermediate specified value Z, the operation starting time can be finely set in accordance with the power consumption amount predicted value (A14 or A24), thereby remarkably reducing a risk of starting the fuel cell 1 in such a state where the power consumption amount falls below the lower limit value of the power generation variable range of the fuel cell 1.

Although the first and second consuming apparatuses exclusively consume power and the power generated by the fuel cell 1 of the cogeneration facility is utilized in the foregoing embodiments, similar effects can be obtained even in the case of consuming heat. In such a case, an operating condition for producing hot water using the heat generated in the fuel cell 1 may be controlled based on an operation schedule information on the heat (e.g. hot water) consumption of the network-connected first consuming apparatuses and the prediction of the actual consumption of the first consuming apparatuses and the second consuming apparatus, which is not network-connected, according to the techniques of the first to sixth embodiments.

The cogeneration systems according to the present invention are described above. A cogeneration facility operation control program for enabling the operations described in the first to sixth embodiments may be prepared and saved in a CD-ROM or the like, and this program may be downloaded from the CD-ROM or the like, for example, to a personal computer used for the control of the cogeneration facility CS or a RAM or the like of a controller (operation controller) belonging to the cogeneration facility CS, thereby enabling the operations of the above cogeneration system.

As described above, an inventive cogeneration system comprises: a cogeneration facility for generating power and heat, a plurality of consuming apparatuses consuming the power and/or heat generated by the cogeneration facility, and an operation controller for controlling the operation of the cogeneration facility.

The consuming apparatuses include a first consuming apparatus capable of automatically transmitting operation schedule information of its own to the operation controller, and a second consuming apparatus incapable of automatically transmitting the operation schedule information of its own. The operation controller compares an operation starting time (t1) of the consuming apparatuses based on the operation schedule information collected from the first consuming apparatus and a consumption starting time (t2) based on the prediction of a total power and/or heat consumption of the first and second consuming apparatuses. The operation starting time of the cogeneration facility is determined with priority given to the operation starting time (t1) if the operation starting time (t1) is earlier than the consumption starting time (t2) while being determined with priority given to the consumption starting time (t2) if the operation starting time (t1) is later than the consumption starting time (t2).

With this construction, even if both the consuming apparatus capable of automatically transmitting the operation schedule information of its own to the operation controller, i.e., the consuming apparatus provided with the network connecting function (first consuming apparatus) and the consuming apparatus provided with no such function (second consuming apparatus) exist, the operation starting time (t2) is determined as the operation starting time of the cogeneration facility if the operation starting time (t2) which should be determined based on the prediction of the total power and/or heat consumption of the first and second consuming apparatuses is earlier. Thus, the operation starting time of the cogeneration facility can be determined in consideration of the existence of the second consuming apparatus. Therefore, as compared to a case where the operation starting time of the cogeneration facility is determined only based on the operation schedule information collected from the first consuming apparatus, operating conditions of a fuel cell and the like can be more efficiently determined, whereby a system useful as a household cogeneration system or the like can be built.

Another inventive cogeneration system comprises a cogeneration facility for generating power and heat, a plurality of consuming apparatuses consuming the power and/ or heat generated by the cogeneration facility, and an operation controller for controlling the operation of the cogeneration facility.

The consuming apparatuses include a first consuming apparatus capable of automatically transmitting operation schedule information of its own to the operation controller, and a second consuming apparatus incapable of automatically transmitting the operation schedule information of its own. The operation controller compares a first operation starting time (t3) of the cogeneration facility which is at or later than an operation starting time (t1) of the consuming apparatuses based on the operation schedule information collected from the first consuming apparatus and should be substantially determined based only on the operation schedule information collected from the first consuming apparatus and a second operation starting time (t4) of the cogeneration facility which should be substantially determined based on the prediction of a total power and/or heat consumption of the first and second consuming apparatuses. The operation starting time of the cogeneration facility is determined with priority given to the first operation starting time (t3) if the first operation starting time (t3) is earlier than the second operation starting time (t4) while being determined with priority given to the second operation starting time (t4) if the first operation starting time (t3) is later than the second operation starting time (t4).

Also, a specified value X of a power and/or heat consumption amount for starting the operation of the cogeneration facility may be preferably set based on a power and/or heat generation amount variable range of the cogeneration facility. A time at which the power and/or heat consumption amount as the operation schedule information of the first consuming apparatus becomes equal to or above the specified value X may be set as the first operation starting time (t3). A time at which a consumption amount predicted value based on the prediction of the total power and/or heat consumption of the first and second consuming apparatuses becomes equal to or above the specified value X may be set as the second operation starting time (t4).

With these construction, instead of merely using the operation starting time of the first consuming apparatus as a comparison factor, the operation starting time of the cogeneration facility can be determined as the time when the load state substantially requiring the support by the cogeneration facility is reached. For example, the operation starting time of the cogeneration facility can be determined by setting the specified value X of the power and/or heat consumption amount for starting the operation of the cogeneration facility and comparing the time (t3) at which the power and/or heat consumption amount as the operation schedule information of the first consuming apparatus becomes equal to or above the specified value X and the time (t4) at which the predicted value of the total power and/or heat consumption amount of the first and second consuming apparatuses becomes equal to or above the specified value X.

Accordingly, a reduction of the durability of the cogeneration facility caused by uselessly repeating the start and the end of the cogeneration facility can be suppressed, and the operating conditions of the fuel cell and the like can be efficiently determined in consideration of the existence of the second consuming apparatus even if both the first consuming apparatus provided with the network connecting function and the second consuming apparatus provided with no network connecting function exist. In such a case, the use of the lower limit value of the power and/or heat generation amount variable range of the cogeneration facility as the specified value X is preferable since the useless operation of the cogeneration facility in such a state where the power consumption amount and the heat consumption amount of the consuming apparatuses fall below the lower limit value can be effectively suppressed.

A specified value X of a power and/or heat consumption amount for starting the operation of the cogeneration facility and an increased specified value Y of the power and/or heat consumption amount larger than the specified value X may be preferably set based on a power and/or heat generation amount variable range of the cogeneration facility. A time at which the power and/or heat consumption amount as the operation schedule information of the first consuming apparatus becomes equal to or above the specified value X may be set as the first operation starting time (t3). A time at which a consumption amount predicted value based on the prediction of the total power and/or heat consumption of the first and second consuming apparatuses becomes equal to or above the increased specified value Y may be set as the second operation starting time (t4).

With this construction, if the time is set based on the increased specified value Y of the power and/or heat consumption amount larger than the specified value X upon setting the operation starting time (t4) based on the prediction of the total power and/or heat consumption amount of the first and second consuming apparatuses, a risk of operating the cogeneration facility in such a state where the power consumption amount and the heat consumption amount of the consuming apparatuses fall below the lower limit value can be more effectively suppressed by making the condition of setting the operation starting time (t4) stricter.

In another cogeneration system comprising a cogeneration facility, a plurality of consuming apparatuses, and an operation controller, the consuming apparatuses include a first consuming apparatus capable of automatically transmitting operation schedule information of its own to the operation controller, and a second consuming apparatus incapable of automatically transmitting the operation schedule information of its own, a specified value X of a power and/or heat consumption amount for starting the operation of the cogeneration facility is set based on a power and/or heat generation amount variable range of the cogeneration facility.

The operation controller includes: a consumption amount calculator for calculating a total power and/or heat consumption amount predicted value (A11) of the first and second consuming apparatuses predicted based on a measurement value of a total power and/or heat consumption amount of the first and second consuming apparatuses, and a power and/or heat consumption amount predicted value (A12) of the first consuming apparatus predicted based on a measurement value of a power and/or heat consumption amount of the first consuming apparatus, and calculating a power and/or heat consumption amount predicted value (A13) of only the second consuming apparatus by subtracting the consumption amount predicted value (A12) from the consumption amount predicted value (A11), a consumption amount predictor for obtaining a power and/or heat consumption amount predicted value (A14) of the first consuming apparatus predicted based on the operation schedule information actually set in the first consuming apparatus, and a total consumption amount predictor for obtaining a total power and/or heat consumption amount predicted value (A15) by adding the consumption amount predicted values (A13) and (A14), and a time at which the consumption amount predicted value (A15) becomes equal to or above the specified value X is determined as an operation starting time (t5) of the cogeneration facility.

In another cogeneration system comprising a cogeneration facility, a plurality of consuming apparatuses, and an operation controller, the consuming apparatuses include a first consuming apparatus capable of automatically transmitting operation schedule information of its own to the operation controller, and a second consuming apparatus incapable of automatically transmitting the operation schedule information of its own, a specified value X of a power and/or heat consumption mount for starting the operation of the cogeneration facility is set based on a power and/or heat generation amount variable range of the cogeneration facility.

The operation controller includes: a consumption amount calculator for calculating a power and/or heat consumption amount (A21-A22) of only the second consuming apparatus by subtracting a measurement value (A22) of a power and/or heat consumption amount of the first consuming apparatus from a measurement value (A21) of a total power and/or heat consumption amount of the first and second consuming apparatuses, and calculating a consumption amount predicted value (A23) of only the second consuming apparatuses based on the calculated consumption amount (A21-A22), a consumption amount predictor for obtaining a power and/or heat consumption amount predicted value (A24) of the first consuming apparatus predicted based on the operation schedule information actually set in the first consuming apparatus, and a total consumption amount predictor for obtaining a total power and/or heat consumption amount predicted value (A25) by adding the consumption amount predicted values (A23) and (A24), and a time at which the consumption amount predicted value (A25) becomes equal to or above the specified value X is determined as an operation starting time (t5) of the cogeneration facility.

With these constructions, instead of determining the operation starting time of the cogeneration facility from a simple sum of the consumption amount predicted values of the first and second consuming apparatuses, the consumption amount is predicted by separately considering the first consuming apparatus capable of substantially predicting the consumption of the day of operation and the second consuming apparatus obliged to have its consumption predicted based on the past operation data. Thus, the operation starting time of the cogeneration facility can be more finely set. Specifically, (1) Obtain the total power and/or heat consumption amount predicted value (A11) of the first and second consuming apparatuses predicted based on the total consumption amount measurement value of the first and second consuming apparatuses, i.e., based on the power consumption patterns depending on the past operation performances (measurement value (A21) in claim 7);

(2) Obtain the power and/or heat consumption amount predicted value (A12) of only the first consuming apparatus similarly predicted based on the power consumption patterns depending on the past operation performances (measurement value (A22) in claim 7);

(3) Calculate the power and/or heat consumption amount predicted value (A13) of the second consuming apparatus incapable of automatically transmitting the operation schedule information of its own and, therefore, obliged to have its consumption predicted based on the past power consumption pattern by subtracting the consumption amount predicted value (A12) or the measurement value (A22) from the consumption amount predicted value (A11) or the measurement value (A21) (consumption amount predicted value (A23) predicted based on the measurement value (A21−A22) in claim 7);

(4) Separately obtain the power and/or heat consumption amount predicted value (A14 or A24) based on the operation schedule information for the first consuming apparatus capable of predicting its consumption amount based on the actually set operation schedule information without depending on the power consumption pattern; and (5) Obtain the total power and/or heat consumption amount predicted value (A15 or A25) of the consumption amount predicted value (A13 or A23) and the consumption amount predicted value (A14 or A24) and determine the time at which this consumption amount predicted value (A15 or A25) becomes equal to or above the specified value X as the operation starting time of the cogeneration facility.

Accordingly, there is an advantage of carrying out such a very fine control as not to start the operation of the cogeneration facility at the time at which the consumption amount predicted value (A11) or the measurement value (A21) predicted from the consumption amount measurement value of the consuming household exceeds the specified value X if evaluation is made by replacing the consumption amount predicted value of the first consuming apparatus accounting for the consumption amount predicted value (A11) or the measurement value (A21) by the consumption amount predicted value (A14 or A24) based on the operation schedule information and this consumption amount predicted value (A14 or A24) does not exceed the specified value X.

Since the power and/or heat consumption amount of the first consuming apparatus can be estimated based on the power consumption pattern thereof without depending on the actual measurement since the first consuming apparatus is capable of automatically transmitting the operation schedule information of its own. Accordingly, there is an advantage of realizing the prediction of the consumption amount without depending on actual measurements, making the use of the characteristic of the first consuming apparatus.

The specified value X of the power and/or heat consumption amount for starting the operation of the cogeneration facility and an increased specified value Y of the power and/or heat consumption amount larger than the specified value X may be preferably set based on the power and/or heat generation amount variable range of the cogeneration facility. A time at which the consumption amount predicted value (A15 or A25) becomes equal to or larger than the increased specified value Y may be determined as the operation starting time (t5) of the cogeneration facility if the power and/or heat consumption amount predicted value (A14 or A24) of the first consuming apparatus predicted based on the operation schedule information actually set in the first consuming apparatus is 0. A time at which the consumption amount predicted value (A15 or A25) becomes equal to or above the specified value X may be determined as the operation starting time (t5) of the cogeneration facility if the consumption amount predicted value (A14 or A24) is equal to or above the specified value X. An intermediate specified value Z (where X≦Z≦Y) may be set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

With this construction, since the specified values X, Y, Z for determining the operation starting time (t5) of the cogeneration facility are set in accordance with the consumption amount predicted value (A14 or A24), a probability of letting the cogeneration facility uselessly operate can be further suppressed.

An inventive operation controller is adapted for controlling the operation of a cogeneration facility for supplying power and heat to a plurality of consuming apparatuses consuming power and/or heat. The operation controller is used in the case that the consuming apparatuses include a first consuming apparatus capable of automatically transmitting operation schedule information of its own to the operation controller, and a second consuming apparatus incapable of automatically transmitting the operation schedule information of its own. An operation starting time (t1) of the consuming apparatuses based on the operation schedule information collected from the first consuming apparatus and a consumption starting time (t2) based on the prediction of a total power and/or heat consumption of the first and second consuming apparatuses are compared, and the operation starting time of the cogeneration facility is determined with priority given to the operation starting time (t1) if the operation starting time (t1) is earlier than the consumption starting time (t2) while being determined with priority given to the consumption starting time (t2) if the operation starting time (t1) is later than the consumption starting time (t2).

Alternatively, a first operation starting time (t3) of the cogeneration facility which is at or later than an operation starting time (t1) of the consuming apparatuses based on the operation schedule information collected from the first consuming apparatus and should be substantially determined based only on the operation schedule information collected from the first consuming apparatus and a second operation starting time (t4) of the cogeneration facility which should be substantially determined based on the prediction of a total power and/or heat consumption of the first and second consuming apparatuses are compared, and the operation starting time of the cogeneration facility is determined with priority given to the first operation starting time (t3) if the first operation starting time (t3) is earlier than the second operation starting time (t4) while being determined with priority given to the second operation starting time (t4) if the first operation starting time (t3) is later than the second operation starting time (t4)

Preferably, a specified value X of a power and/or heat consumption amount for starting the operation of the cogeneration facility may be set based on a power and/or heat generation amount variable range of the cogeneration facility, a time at which the power and/or heat consumption amount as the operation schedule information of the first consuming apparatus becomes equal to or above the specified value X may be set as the first operation starting time (t3), and a time at which a consumption amount predicted value based on the prediction of the total power and/or heat consumption of the first and second consuming apparatuses becomes equal to or above the specified value X may be set as the second operation starting time (t4).

Preferably, a specified value X of a power and/or heat consumption amount for starting the operation of the cogeneration facility and an increased specified value Y of the power and/or heat consumption amount larger than the specified value X may be set based on a power and/or heat generation amount variable range of the cogeneration facility, a time at which the power and/or heat consumption amount as the operation schedule information of the first consuming apparatus becomes equal to or above the specified value X may be set as the first operation starting time (t3), and a time at which a consumption amount predicted value based on the prediction of the total power and/or heat consumption of the first and second consuming apparatuses becomes equal to or above the increased specified value Y may be set as the second operation starting time (t4).

A lower limit value of the power and/or heat generation amount variable range of the cogeneration facility may be preferably used as the specified value X of the power and/or heat consumption amount.

In an operation controller, a specified value X of a power and/or heat consumption amount for starting the operation of the cogeneration facility is set based on a power and/or heat generation amount variable range of the cogeneration facility. The operation controller comprises a consumption amount calculator for calculating a total power and/or heat consumption amount predicted value (A11) of the first and second consuming apparatuses predicted based on a measurement value of a total power and/or heat consumption amount of the first and second consuming apparatuses, and a power and/or heat consumption amount predicted value (A12) of the first consuming apparatus predicted based on a measurement value of a power and/or heat consumption amount of the first consuming apparatus, and calculating a power and/or heat consumption amount predicted value (A13) of only the second consuming apparatus by subtracting the consumption amount predicted value (A12) from the consumption amount predicted value (A11), a consumption amount predictor for obtaining a power and/or heat consumption amount predicted value (A14) of the first consuming apparatus predicted based on the operation schedule information actually set in the first consuming apparatus, and a total consumption amount predictor for obtaining a total power and/or heat consumption amount predicted value (A15) by adding the consumption amount predicted values (A13) and (A14), and a time at which the consumption amount predicted value (A15) becomes equal to or above the specified value X is determined as an operation starting time (t5) of the cogeneration facility.

In an inventive operation controller, a specified value X of a power and/or heat consumption amount for starting the operation of the cogeneration facility is set based on a power and/or heat generation amount variable range of the cogeneration facility. The operation controller comprises a consumption amount calculator for calculating a power and/or heat consumption amount (A21−A22) of only the second consuming apparatus by subtracting a measurement value (A22) of a power and/or heat consumption amount of the first consuming apparatus from a measurement value (A21) of a total power and/or heat consumption amount of the first and second consuming apparatuses, and calculating a consumption amount predicted value (A23) of only the second consuming apparatuses based on the calculated consumption amount (A21−A22), a consumption amount predictor for obtaining a power and/or heat consumption amount predicted value (A24) of the first consuming apparatus predicted based on the operation schedule information actually set in the first consuming apparatus, and a total consumption amount predictor for obtaining a total power and/or heat consumption amount predicted value (A25) by adding the consumption amount predicted values (A23) and (A24), and a time at which the consumption amount predicted value (A25) becomes equal to or above the specified value X is determined as an operation starting time (t5) of the cogeneration facility.

Preferably, the measurement value of the power and/or heat consumption amount of the first consuming apparatus may be an estimated value based on a power and/or heat consumption pattern of the first consuming apparatus.

With these operation controllers, even if both the consuming apparatus capable of automatically transmitting the operation schedule information of its own to the operation controller, i.e., the consuming apparatus provided with the network connecting function (first consuming apparatus) and the consuming apparatus provided with no such function (second consuming apparatus) exist, the operation controller of the cogeneration facility can properly set the operation starting time of the cogeneration facility, thereby sufficiently exhibiting the merit of introducing the cogeneration facility.

In the inventive cogeneration system, the specified value X of the power and/or heat consumption amount for starting the operation of the cogeneration facility and an increased specified value Y of the power and/or heat consumption amount larger than the specified value X may be preferably set based on the power and/or heat generation amount variable range of the cogeneration facility, a time at which the consumption amount predicted value (A15 or A25) becomes equal to or larger than the increased specified value Y may be determined as the operation starting time (t5) of the cogeneration facility if the power and/or heat consumption amount predicted value (A14 or A24) of the first consuming apparatus predicted based on the operation schedule information actually set in the first consuming apparatus is 0, a time at which the consumption amount predicted value (A15 or A25) becomes equal to or above the specified value X may be determined as the operation starting time (t5) of the cogeneration facility if the consumption amount predicted value (A14 or A24) is equal to or above the specified value X, and an intermediate specified value Z (where $X \leq Z \leq Y$) may be set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z may be determined as the operation starting time (t5) of the cogeneration facility.

An inventive operation control program for controlling the operation of a cogeneration facility causes the implementation of operation steps of: obtaining and comparing an operation starting time (t1) of the consuming apparatuses based on the operation schedule information collected from the first consuming apparatus and a consumption starting time (t2) based on the prediction of a total power and/or heat consumption of the first and second consuming apparatuses, and determining the operation starting time of the cogeneration facility with priority given to the operation starting time (t1) if the operation starting time (t1) is earlier than the consumption starting time (t2) while determining it with priority given to the consumption starting time (t2) if the operation starting time (t1) is later than the consumption starting time (t2).

Another inventive operation control program causes the implementation of operation steps of: obtaining and comparing a first operation starting time (t3) of the cogeneration facility which is at or later than an operation starting time (t1) of the consuming apparatuses based on the operation schedule information collected from the first consuming apparatus and should be substantially determined based only on the operation schedule information collected from the first consuming apparatus and a second operation starting time (t4) of the cogeneration facility which should be substantially determined based on the prediction of a total power and/or heat consumption of the first and second consuming apparatuses, and determining the operation starting time of the cogeneration facility with priority given to the first operation starting time (t3) if the first operation starting time (t3) is earlier than the second operation starting time (t4) while determining it with priority given to the second operation starting time (t4) if the first operation starting time (t3) is later than the second operation starting time (t4).

Further, the operation control program may be provided with steps of: setting a specified value X of a power and/or heat consumption amount for starting the operation of the cogeneration facility based on a power and/or heat generation amount variable range of the cogeneration facility, setting a time at which the power and/or heat consumption amount as the operation schedule information of the first consuming apparatus becomes equal to or above the specified value X as the first operation starting time (t3), and setting a time at which a consumption amount predicted value based on the prediction of the total power and/or heat consumption of the first and second consuming apparatuses becomes equal to or above the specified value X as the second operation starting time (t4).

The inventive operation control program may be further provided with steps of: setting a specified value X of a power and/or heat consumption amount for starting the operation of the cogeneration facility and an increased specified value Y of the power and/or heat consumption amount larger than the specified value X based on a power and/or heat generation amount variable range of the cogeneration facility, setting a time at which the power and/or heat consumption amount as the operation schedule information of the first consuming apparatus becomes equal to or above the specified value X as the first operation starting time (t3), and setting a time at which a consumption amount predicted value based on the prediction of the total power and/or heat consumption of the first and second consuming apparatuses becomes equal to or above the increased specified value Y as the second operation starting time (t4).

In the operation control program, a lower limit value of the power and/or heat generation amount variable range of the cogeneration facility may be used as the specified value X of the power and/or heat consumption amount.

An another inventive operation control program causes the implementation of operation steps of: receiving a specified value X of a power and/or heat consumption amount for starting the operation of the cogeneration facility as a set value based on a power and/or heat generation amount variable range of the cogeneration facility, obtaining a total power and/or heat consumption amount predicted value (A11) of the first and second consuming apparatuses predicted based on a measurement value of a total power and/or heat consumption amount of the first and second consuming apparatuses, and a power and/or heat consumption amount predicted value (A12) of the first consuming apparatus predicted based on a measurement value of a power and/or heat consumption amount of the first consuming apparatus, and calculating a power and/or heat consumption amount predicted value (A13) of only the second consuming apparatus by subtracting the consumption amount predicted value (A12) from the consumption amount predicted value (A11), obtaining a power and/or heat consumption amount predicted value (A14) of the first consuming apparatus predicted based on the operation schedule information actually set in the first consuming apparatus, and obtaining a total power and/or heat consumption amount predicted value (A15) by adding the consumption amount predicted values (A13) and (A14), and determining a time at which the consumption amount predicted value (A15) becomes equal to or above the specified value X as an operation starting time (t5) of the cogeneration facility.

An another inventive operation control program causes the implementation of operation steps of: receiving a specified value X of a power and/or heat consumption amount for starting the operation of the cogeneration facility as a set value based on a power and/or heat generation amount variable range of the cogeneration facility, calculating a power and/or heat consumption amount (A21−A22) of only the second consuming apparatus by subtracting a measurement value (A22) of a power and/or heat consumption amount of the first consuming apparatus from a measurement value (A21) of a total power and/or heat consumption amount of the first and second consuming apparatuses, and calculating a consumption amount predicted value (A23) of only the second consuming apparatuses based on the calculated consumption amount (A21−A22), obtaining a power and/or heat consumption amount predicted value (A24) of the first consuming apparatus predicted based on the operation schedule information actually set in the first consuming apparatus, and obtaining a total power and/or heat consumption amount predicted value (A25) by adding the consumption amount predicted values (A23) and (A24), and determining a time at which the consumption amount predicted value (A25) becomes equal to or above the specified value X as an operation starting time (t5) of the cogeneration facility.

The measurement value of the power and/or heat consumption amount of the first consuming apparatus may be an estimated value based on a power and/or heat consumption pattern of the first consuming apparatus.

Preferably, the specified value X of the power and/or heat consumption amount for starting the operation of the cogeneration facility and an increased specified value Y of the power and/or heat consumption amount larger than the specified value X may be set based on the power and/or heat generation amount variable range of the cogeneration facility, a time at which the consumption amount predicted value (A15 or A25) becomes equal to or larger than the increased specified value Y may be determined as the operation starting time (t5) of the cogeneration facility if the power and/or heat consumption amount predicted value (A14 or A24) of the first consuming apparatus predicted based on the operation schedule information actually set in the first consuming apparatus is 0, a time at which the consumption amount predicted value (A15 or A25) becomes equal to or above the specified value X may be determined as the operation starting time (t5) of the cogeneration facility if the consumption amount predicted value (A14 or A24) is equal to or above the specified value X, and an intermediate specified value Z (where $X \leq Z \leq Y$) is set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

With these construction, even if both the consuming apparatus capable of automatically transmitting the operation schedule information of its own to the operation controller, i.e., the consuming apparatus provided with the network connecting function (first consuming apparatus) and the consuming apparatus provided with no such function (second consuming apparatus) exist, the operation starting time of the cogeneration facility can be properly set by the operation control program of the cogeneration facility, thereby sufficiently exhibiting the merit of introducing the cogeneration facility.

The inventive cogeneration system can efficiently determine the operation starting time of the cogeneration facility even if both consuming apparatuses provided with the network connecting function and the one (those) provided with no network connecting function exit. Accordingly, the inventive cogeneration system can be suitably used as a cogeneration system for general household expected to include both network-connected white household apparatuses and conventional household apparatuses for the time being. Further, the invention is applicable to cogeneration systems in general utilizing fuel cells (low-temperature fuel cells) capable of being repeatedly started and ended.

This application is based on patent applications No. 2003-305643 and No. 2004-217218 filed in Japan, the contents of which are hereby incorporated by references.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A cogeneration system, comprising:
a cogeneration facility for generating power and heat;
a plurality of consuming apparatuses consuming the power and/or heat generated by the cogeneration facility; and
an operation controller for controlling the operation of the cogeneration facility;
wherein the consuming apparatuses include a first consuming apparatus capable of automatically transmitting operation schedule information of its own to the operation controller, and a second consuming apparatus incapable of automatically transmitting the operation schedule information of its own;
the operation controller compares an operation starting time (t1) of the consuming apparatuses based on the operation schedule information collected from the first consuming apparatus and a consumption starting time (t2) based on the prediction of a total power and/or heat consumption of the first and second consuming apparatuses; and an actual operation starting time of the cogeneration facility is determined with priority given to the operation starting time (t1) if the operation starting time (t1) is earlier than the consumption starting time (t2) while being determined with priority given to the consumption starting time (t2) if the operation starting time (t1) is later than the consumption starting time (t2).

2. A cogeneration system, comprising:
a cogeneration facility for generating power and heat;
a plurality of consuming apparatuses consuming the power and/or heat generated by the cogeneration facility; and
an operation controller for controlling the operation of the cogeneration facility;
wherein the consuming apparatuses include a first consuming apparatus capable of automatically transmitting operation schedule information of its own to the operation controller,: and a second consuming apparatus incapable of automatically transmitting the operation schedule information of its own;
the operation controller compares a first operation starting time (t3) of the cogeneration facility which is at or later than an operation starting time (t1) of the consuming apparatuses based on the operation schedule information collected from the first consuming apparatus and should be substantially determined based only on the operation schedule information collected from the first consuming apparatus and a second operation starting time (t4) of the cogeneration facility which should be substantially determined based on the prediction of a total power and/or heat consumption of the first and second consuming apparatuses; and
an actual operation starting time of the cogeneration facility is determined with priority given to the first operation starting time (t3) if the first operation starting time (t3) is earlier than the second operation starting time (t4) while being determined with priority given to the second operation starting time (t4) if the first operation starting time (t3) is later than the second operation starting time (t4).

3. A cogeneration system according to claim 2, wherein:
a specified value X of a power and/or heat consumption amount for starting the operation of the cogeneration facility is set based on a power and/or heat generation amount variable range of the cogeneration facility;
a time at which the power and/or heat consumption amount as the operation schedule information of the first consuming apparatus becomes equal to or above the specified value X is set as the first operation starting time (t3); and
a time at which a consumption amount predicted value based on the prediction of the total power and/or heat consumption of the first and second consuming apparatuses becomes equal to or above the specified value X is set as the second operation starting time (t4).

4. A cogeneration system according to claim 3, wherein a lower limit value of the power and/or heat generation amount variable range of the cogeneration facility is used as the specified value X of the power and/or heat consumption amount.

5. A cogeneration system according to claim 2, wherein:
a specified value X of a power and/or heat consumption amount for starting the operation of the cogeneration facility and an increased specified value Y of the power and/or heat consumption amount larger than the specified value X are set based on a power and/or heat generation amount variable range of the cogeneration facility;

a time at which the power and/or heat consumption amount as the operation schedule information of the first consuming apparatus becomes equal to or above the specified value X is set as the first operation starting time (t3); and a time at which a consumption amount predicted value based on the prediction of the total power and/or heat consumption of the first and second consuming apparatuses becomes equal to or above the increased specified value Y is set as the second operation starting time (t4).

6. A cogeneration system according to claim 5, wherein a lower limit value of the power and/or heat generation amount variable range of the cogeneration facility is used as the specified value X of the power and/or heat consumption amount.

7. A cogeneration system, comprising:
a cogeneration facility for generating power and heat,
a plurality of consuming apparatuses consuming the power and/or heat generated by the cogeneration facility, and
an operation controller for controlling the operation of the cogeneration facility,
wherein the consuming apparatuses include a first consuming apparatus capable of automatically transmitting operation schedule information of its own to the operation controller, and a second consuming apparatus incapable of automatically transmitting the operation schedule information of its own,
a specified value X of a power and/or heat consumption amount for starting the operation of the cogeneration facility is set based on a power and/or heat generation amount variable range of the cogeneration facility,
the operation controller includes:
a consumption amount calculator for calculating a total power and/or heat consumption amount predicted value (A11) of the first and second consuming apparatuses predicted based on a measurement value of a total power and/or heat consumption amount of the first and second consuming apparatuses, and a power and/or heat consumption amount predicted value (A12) of the first consuming apparatus predicted based on a measurement value of a power and/or heat consumption amount of the first consuming apparatus, and calculating a power and/or heat consumption amount predicted value (A13) of only the second consuming apparatus by subtracting the consumption amount predicted value (A12) from the consumption amount predicted value (A11),
a consumption amount predictor for obtaining a power and/or heat consumption amount predicted value (A14) of the first consuming apparatus predicted based on the operation schedule information actually set in the first consuming apparatus, and
a total consumption amount predictor for obtaining a total power and/or heat consumption amount predicted value (A15) by adding the consumption amount predicted values (A13) and (A14), and
a time at which the consumption amount predicted value (A15) becomes equal to or above the specified value X is determined as an operation starting time (t5) of the cogeneration facility.

8. A cogeneration system according to claim 7, wherein the measurement value of the power and/or heat consumption amount of the first consuming apparatus is an estimated value based on a power and/or heat consumption pattern of the first consuming apparatus.

9. A cogeneration system according to claim 7, wherein:
the specified value X of the power and/or heat consumption amount for starting the operation of the cogeneration facility and an increased specified value Y of the power and/or heat consumption amount larger than the specified value X are set based on the power and/or heat generation amount variable range of the cogeneration facility,
a time at which the consumption amount predicted value (A15 or A25) becomes equal to or larger than the increased specified value Y is determined as the operation starting time (t5) of the cogeneration facility if the power and/or heat consumption amount predicted value (A14 or A24) of the first consuming apparatus predicted based on the operation schedule information actually set in the first consuming apparatus is 0,
a time at which the consumption amount predicted value (A15 or A25) becomes equal to or above the specified value X is determined as the operation starting time (t5) of the cogeneration facility if the consumption amount predicted value (A14 or A24) is equal to or above the specified value X, and
an intermediate specified value Z (where $X \leq Z \leq Y$) is set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

10. A cogeneration system, comprising:
a cogeneration facility for generating power and heat,
a plurality of consuming apparatuses consuming the power and/or heat generated by the cogeneration facility, and
an operation controller for controlling the operation of the cogeneration facility,
wherein the consuming apparatuses include a first consuming apparatus capable of automatically transmitting operation schedule information of its own to the operation controller, and a second consuming apparatus incapable of automatically transmitting the operation schedule information of its own,
a specified value X of a power and/or heat consumption amount for starting the operation of the cogeneration facility is set based on a power and/or heat generation amount variable range of the cogeneration facility,
the operation controller includes:
a consumption amount calculator for calculating a power and/or heat consumption amount (A21–A22) of only the second consuming apparatus by subtracting a measurement value (A22) of a power and/or heat consumption amount of the first consuming apparatus from a measurement value (A21) of a total power and/or heat consumption amount of the first and second consuming apparatuses, and calculating a consumption amount predicted value (A23) of only the second consuming apparatuses based on the calculated consumption amount (A21–A22),
a consumption amount predictor for obtaining a power and/or heat consumption amount predicted value (A24) of the first consuming apparatus predicted based on the operation schedule information actually set in the first consuming apparatus, and a total consumption amount predictor for obtaining a total power and/or heat consumption amount predicted value (A25) by adding the consumption amount predicted values (A23) and (A24), and a time at which the consumption amount predicted value (A25) becomes equal to or above the specified value X is determined as an operation starting time (t5) of the cogeneration facility.

11. A cogeneration system according to claim 10, wherein the measurement value of the power and/or heat consumption amount of the first consuming apparatus is an estimated value based on a power and/or heat consumption pattern of the first consuming apparatus.

12. A cogeneration system according to claim 10, wherein:

the specified value X of the power and/or heat consumption amount for starting the operation of the cogeneration facility and an increased specified value Y of the power and/or heat consumption amount larger than the specified value X are set based on the power and/or heat generation amount variable range of the cogeneration facility, a time at which the consumption amount predicted value (A15 or A25) becomes equal to or larger than the increased specified value Y is determined as the operation starting time (t5) of the cogeneration facility if the power and/or heat consumption amount predicted value (A14 or A24) of the first consuming apparatus predicted based on the operation schedule information actually set in the first consuming apparatus is 0, a time at which the consumption amount predicted value (A15 or A25) becomes equal to or above the specified value X is determined as the operation starting time (t5) of the cogeneration facility if the consumption amount predicted value (A14 or A24) is equal to or above the specified value X, and an intermediate specified value Z (where X≦Z≦Y) is set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

13. An operation controller for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, wherein:

an operation starting time (t1) of the consuming apparatuses based on the operation schedule information collected from the first consuming apparatus and a consumption starting time (t2) based on the prediction of a total power and/or heat consumption of the first and second consuming apparatuses are compared, and an actual operation starting time of the cogeneration facility is determined with priority given to the operation starting time (t1) if the operation starting time (t1) is earlier than the consumption starting time (t2) while being determined with priority given to the consumption starting time (t2) if the operation starting time (t1) is later than the consumption starting time (t2).

14. An operation controller for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, wherein:

a first operation starting time (t3) of the cogeneration facility which is at or later than an operation starting time (t1) of the consuming apparatuses based on the operation schedule information collected from the first consuming apparatus and should be substantially determined based only on the operation schedule information collected from the first consuming apparatus and a second operation starting time (t4) of the cogeneration facility which should be substantially determined based on the prediction of a total power and/or heat consumption of the first and second consuming apparatuses are compared, and an actual operation starting time of the cogeneration facility is determined with priority given to the first operation starting time (t3) if the first operation starting time (t3) is earlier than the second operation starting time (t4) while being determined with priority given to the second operation starting time (t4) if the first operation starting time (t3) is later than the second operation starting time (t4).

15. An operation controller of the cogeneration facility according to claim 14, wherein a specified value X of a power and/or heat consumption amount for starting the operation of the cogeneration facility is set based on a power and/or heat generation amount variable range of the cogeneration facility, a time at which the power and/or heat consumption amount as the operation schedule information of the first consuming apparatus becomes equal to or above the specified value X is set as the first operation starting time (t3), and a time at which a consumption amount predicted value based on the prediction of the total power and/or heat consumption of the first and second consuming apparatuses becomes equal to or above the specified value X is set as the second operation starting time (t4).

16. An operation controller of the cogeneration facility according to claim 15, wherein a lower limit value of the power and/or heat generation amount variable range of the cogeneration facility is used as the specified value X of the power and/or heat consumption amount.

17. An operation controller of the cogeneration facility according to claim 14, wherein:

a specified value X of a power and/or heat consumption amount for starting the operation of the cogeneration facility and an increased specified value Y of the power and/or heat consumption amount larger than the specified value X are set based on a power and/or heat generation amount variable range of the cogeneration facility, a time at which the power and/or heat consumption amount as the operation schedule information of the first consuming apparatus becomes equal to or above the specified value X is set as the first operation starting time (t3), and a time at which a consumption amount predicted value based on the prediction of the total power and/or heat consumption of the first and second consuming apparatuses becomes equal to or above the increased specified value Y is set as the second operation starting time (t4).

18. An operation controller of the cogeneration facility according to claim 17, wherein a lower limit value of the power and/or heat generation amount variable range of the cogeneration facility is used as the specified value X of the power and/or heat consumption amount.

19. An operation controller for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, wherein:

a specified value X of a power and/or heat consumption amount for starting the operation of the cogeneration facility is set based on a power and/or heat generation amount variable range of the cogeneration facility, the operation controller comprises:

a consumption amount calculator for calculating a total power and/or heat consumption amount predicted value (A11) of the first and second consuming apparatuses predicted based on a measurement value of a total power and/or heat consumption amount of the first and second consuming apparatuses, and a power and/or heat consumption amount predicted value (A12) of the first consuming apparatus predicted based on a measurement value of a power and/or heat consumption amount of the first consuming apparatus, and calculating a power and/or heat consumption amount predicted value (A13) of only the second consuming apparatus by subtracting the consumption amount predicted value (A12) from the consumption amount predicted value (A11), a consumption amount predictor for obtaining a power and/or heat consumption amount predicted value (A14) of the first consuming apparatus predicted based on the operation schedule information actually set in the first consuming apparatus, and a total consumption amount predictor for obtaining a total power and/or heat consumption amount predicted value (A15) by adding the consumption amount predicted values (A13) and (A14), and a time at which the consumption amount predicted value (A15) becomes equal to or above the specified value X is determined as an operation starting time (t5) of the cogeneration facility.

20. An operation controller according to claim 19, wherein the measurement value of the power and/or heat consumption amount of the first consuming apparatus is an estimated value based on a power and/or heat consumption pattern of the first consuming apparatus.

21. A cogeneration system according to claim 19, wherein:

the specified value X of the power and/or heat consumption amount for starting the operation of the cogeneration facility and an increased specified value Y of the power and/or heat consumption amount larger than the specified value X are set based on the power and/or heat generation amount variable range of the cogeneration facility, a time at which the consumption amount predicted value (A15 or A25) becomes equal to or larger than the increased specified value Y is determined as the operation starting time (t5) of the cogeneration facility if the power and/or heat consumption amount predicted value (A14 or A24) of the first consuming apparatus predicted based on the operation schedule information actually set in the first consuming apparatus is 0, a time at which the consumption amount predicted value (A15 or A25) becomes equal to or above the specified value X is determined as the operation starting time (t5) of the cogeneration facility if the consumption amount predicted value (A14 or A24) is equal to or above the specified value X, and an intermediate specified value Z (where X≦Z≦Y) is set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

22. An operation controller for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, wherein:

a specified value X of a power and/or heat consumption amount for starting the operation of the cogeneration facility is set based on a power and/or heat generation amount variable range of the cogeneration facility, the operation controller comprises:

a consumption amount calculator for calculating a power and/or heat consumption amount (A21–A22) of only the second consuming apparatus by subtracting a measurement value (A22) of a power and/or heat consumption amount of the first consuming apparatus from a measurement value (A21) of a total power and/or heat consumption amount of the first and second consuming apparatuses, and calculating a consumption amount predicted value (A23) of only the second consuming apparatuses based on the calculated consumption amount (A21–A22), a consumption amount predictor for obtaining a power and/or heat consumption amount predicted value (A24) of the first consuming apparatus predicted based on the operation schedule information actually set in the first consuming apparatus, and a total consumption amount predictor for obtaining a total power and/or heat consumption amount predicted value (A25) by adding the consumption amount predicted values (A23) and (A24), and a time at which the consumption amount predicted value (A25) becomes equal to or above the specified value X is determined as an operation starting time (t5) of the cogeneration facility.

23. An operation controller according to claim 22, wherein the measurement value of the power and/or heat consumption amount of the first consuming apparatus is an estimated value based on a power and/or heat consumption pattern of the first consuming apparatus.

24. A cogeneration system according to claim 22, wherein:
the specified value X of the power and/or heat consumption amount for starting the operation of the cogeneration facility and an increased specified value Y of the power and/or heat consumption amount larger than the specified value X are set based on the power and/or heat generation amount variable range of the cogeneration facility,
a time at which the consumption amount predicted value (A15 or A25) becomes equal to or larger than the increased specified value Y is determined as the operation starting time (t5) of the cogeneration facility if the power and/or heat consumption amount predicted value (A14 or A24) of the first consuming apparatus predicted based on the operation schedule information actually set in the first consuming apparatus is 0,
a time at which the consumption amount predicted value (A15 or A25) becomes equal to or above the specified value X is determined as the operation starting time (t5) of the cogeneration facility if the consumption amount predicted value (A14 or A24) is equal to or above the specified value X, and
an intermediate specified value Z (where $X \leqq Z \leqq Y$) is set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

25. An operation control program for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, the operation control program causing the implementation of operation steps of:
obtaining and comparing an operation starting time (t1) of the consuming apparatuses based on the operation schedule information collected from the first consuming apparatus and a consumption starting time (t2) based on the prediction of a total power and/or heat consumption of the first and second consuming apparatuses, and
determining an actual operation starting time of the cogeneration facility with priority given to the operation starting time (t1) if the operation starting time (t1) is earlier than the consumption starting time (t2) while determining it with priority given to the consumption starting time (t2) if the operation starting time (t1) is later than the consumption starting time (t2).

26. An operation control program for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, the operation control program causing the implementation of operation steps of:
obtaining and comparing a first operation starting time (t3) of the cogeneration facility which is at or later than an operation starting time (t1) of the consuming apparatuses based on the operation schedule information collected from the first consuming apparatus and should be substantially determined based only on the operation schedule information collected from the first consuming apparatus and a second operation starting time (t4) of the cogeneration facility which should be substantially determined based on the prediction of a total power and/or heat consumption of the first and second consuming apparatuses, and
determining an actual operation starting time of the cogeneration facility with priority given to the first operation starting time (t3) if the first operation starting time (t3) is earlier than the second operation starting time (t4) while determining it with priority given to the second operation starting time (t4) if the first operation starting time (t3) is later than the second operation starting time (t4).

27. An operation control program for the cogeneration facility according to claim 26, further causing the implementation of operation steps of:
setting a specified value X of a power and/or heat consumption amount for starting the operation of the cogeneration facility based on a power and/or heat generation amount variable range of the cogeneration facility,
setting a time at which the power and/or heat consumption amount as the operation schedule information of the first consuming apparatus becomes equal to or above the specified value X as the first operation starting time (t3), and
setting a time at which a consumption amount predicted value based on the prediction of the total power and/or heat consumption of the first and second consuming apparatuses becomes equal to or above the specified value X as the second operation starting time (t4).

28. An operation control program for the cogeneration facility according to claim 27, wherein a lower limit value of the power and/or heat generation amount variable range of the cogeneration facility is used as the specified value X of the power and/or heat consumption amount.

29. An operation control program for the cogeneration facility according to claim 26, further causing the implementation of operation steps of:
setting a specified value X of a power and/or heat consumption amount for starting the operation of the cogeneration facility and an increased specified value Y of the power and/or heat consumption amount larger than the specified value X based on a power and/or heat generation amount variable range of the cogeneration facility,
setting a time at which the power and/or heat consumption amount as the operation schedule information of the first consuming apparatus becomes equal to or above the specified value X as the first operation starting time (t3), and
setting a time at which a consumption amount predicted value based on the prediction of the total power and/or heat consumption of the first and second consuming apparatuses becomes equal to or above the increased specified value Y as the second operation starting time (t4).

30. An operation control program for the cogeneration facility according to claim 29, wherein a lower limit value of the power and/or heat generation amount variable range of the cogeneration facility is used as the specified value X of the power and/or heat consumption amount.

31. An operation control program for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, the operation control program causing the implementation of operation steps of:

receiving a specified value X of a power and/or heat consumption amount for starting the operation of the cogeneration facility as a set value based on a power and/or heat generation amount variable range of the cogeneration facility obtaining a total power and/or heat consumption amount predicted value (A11) of the first and second consuming apparatuses predicted based on a measurement value of a total power and/or heat consumption amount of the first and second consuming apparatuses, and a power and/or heat consumption amount predicted value (A12) of the first consuming apparatus predicted based on a measurement value of a power and/or heat consumption amount of the first consuming apparatus, and calculating a power and/or heat consumption amount predicted value (A13) of only the second consuming apparatus by subtracting the consumption amount predicted value (A12) from the consumption amount predicted value (A11), obtaining a power and/or heat consumption amount predicted value (A14) of the first consuming apparatus predicted based on the operation schedule information actually set in the first consuming apparatus, and obtaining a total power and/or heat consumption amount predicted value (A15) by adding the consumption amount predicted values (A13) and (A14), and determining a time at which the consumption amount predicted value (A15) becomes equal to or above the specified value X as an operation starting time (t5) of the cogeneration facility.

32. An operation control program for a cogeneration facility according to claim 31, wherein the measurement value of the power and/or heat consumption amount of the first consuming apparatus is an estimated value based on a power and/or heat consumption pattern of the first consuming apparatus.

33. An operation control program for a cogeneration facility according to any one of claims 31, wherein:

the specified value X of the power and/or heat consumption amount for starting the operation of the cogeneration facility and an increased specified value Y of the power and/or heat consumption amount larger than the specified value X are set based on the power and/or heat generation amount variable range of the cogeneration facility, a time at which the consumption amount predicted value (A15 or A25) becomes equal to or larger than the increased specified value Y is determined as the operation starting time (t5) of the cogeneration facility if the power and/or heat consumption amount predicted value (A14 or A24) of the first consuming apparatus predicted based on the operation schedule information actually set in the first consuming apparatus is 0, a time at which the consumption amount predicted value (A15 or A25) becomes equal to or above the specified value X is determined as the operation starting time (t5) of the cogeneration facility if the consumption amount predicted value (A14 or A24) is equal to or above the specified value X, and an intermediate specified value Z (where $X \leq Z \leq Y$) is set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

34. An operation control program for controlling the operation of a cogeneration facility for supplying power and heat to a plurality of consuming apparatuses consuming power and/or heat, the operation controller being used in the case that the consuming apparatuses include a first consuming apparatus capable of automatically transmitting operation schedule information of its own to the operation controller, and a second consuming apparatus incapable of automatically transmitting the operation schedule information of its own, the operation control program causing the implementation of operation steps of:

receiving a specified value X of a power and/or heat consumption amount for starting the operation of the cogeneration facility as a set value based on a power and/or heat generation amount variable range of the cogeneration facility, calculating a power and/or heat consumption amount (A21–A22) of only the second consuming apparatus by subtracting a measurement value (A22) of a power and/or heat consumption amount of the first consuming apparatus from a measurement value (A21) of a total power and/or heat consumption amount of the first and second consuming apparatuses, and calculating a consumption amount predicted value (A23) of only the second consuming apparatuses based on the calculated consumption amount (A21–A22), obtaining a power and/or heat consumption amount predicted value (A24) of the first consuming apparatus predicted based on the operation schedule information actually set in the first consuming apparatus, and obtaining a total power and/or heat consumption amount predicted value (A25) by adding the consumption amount predicted values (A23) and (A24), and determining a time at which the consumption amount predicted value (A25) becomes equal to or above the specified value X as an operation starting time (t5) of the cogeneration facility.

35. An operation control program for a cogeneration facility according to claim 34, wherein the measurement value of the power and/or heat consumption amount of the first consuming apparatus is an estimated value based on a power and/or heat consumption pattern of the first consuming apparatus.

36. An operation control program for a cogeneration facility according to claim 34, wherein:

the specified value X of the power and/or heat consumption amount for starting the operation of the cogeneration facility and an increased specified value Y of the power and/or heat consumption amount larger than the specified value X are set based on the power and/or heat generation amount variable range of the cogeneration facility, a time at which the consumption amount predicted value (A15 or A25) becomes equal to or larger than the increased specified value Y is determined as the operation starting time (t5) of the cogeneration facility if the power and/or heat consumption amount predicted value (A14 or A24) of the first consuming apparatus predicted based on the operation schedule information actually set in the first consuming apparatus is 0, a time at which the consumption amount predicted value (A15 or A25) becomes equal to or above the specified value X is determined as the operation starting time (t5) of the cogeneration facility if the consumption amount predicted value (A14 or A24) is equal to or above the specified value X, and an intermediate specified value Z (where $X \leq Z \leq Y$) is set in accordance with the consumption amount predicted value (A14 or A24) if the consumption amount predicted value (A14 or A24) is larger than 0, but below the specified value X, and a time at which the consumption amount predicted value (A15 or A25) becomes equal to or above the intermediate specified value Z is determined as the operation starting time (t5) of the cogeneration facility.

* * * * *

UNITED STATES PATENT AND TRADEMARK OFFICE
CERTIFICATE OF CORRECTION

PATENT NO. : 6,988,024 B2
DATED : January 17, 2006
INVENTOR(S) : Masami Funakura et al.

It is certified that error appears in the above-identified patent and that said Letters Patent is hereby corrected as shown below:

Column 32,
Line 18, delete ":" after "," and before "and".

Signed and Sealed this

Twenty-third Day of May, 2006

JON W. DUDAS
*Director of the United States Patent and Trademark Office*